(12) United States Patent
Palombini et al.

(10) Patent No.: US 11,973,288 B1
(45) Date of Patent: Apr. 30, 2024

(54) APPARATUS FOR A LOCKING THERMAL CONDITIONING HOSE FOR AN ELECTRIC AIRCRAFT AND METHOD OF USE

(71) Applicant: BETA AIR, LLC, South Burlington, VT (US)

(72) Inventors: John Charles Palombini, South Burlington, VT (US); Jake Pill, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 18/121,814

(22) Filed: Mar. 15, 2023

(51) Int. Cl.
| | |
|---|---|
| *H01R 13/00* | (2006.01) |
| *B60L 53/16* | (2019.01) |
| *F28F 9/26* | (2006.01) |
| *H01M 10/625* | (2014.01) |

(52) U.S. Cl.
CPC ............ *H01R 13/005* (2013.01); *B60L 53/16* (2019.02); *F28F 9/26* (2013.01); *H01M 10/625* (2015.04); *H01R 2201/26* (2013.01)

(58) Field of Classification Search
CPC .......... H01R 13/005; B60L 53/16; F28F 9/26; H01M 10/625
USPC ....................................................... 439/106
See application file for complete search history.

(56) References Cited

U.S. PATENT DOCUMENTS

| | | | | |
|---|---|---|---|---|
| 8,963,481 B2 * | 2/2015 | Prosser | .................. | B60L 53/00 320/105 |
| 9,056,555 B1 * | 6/2015 | Zhou | ...................... | B60L 53/35 |
| 9,233,618 B2 * | 1/2016 | Dyer | ....................... | B60L 53/31 |
| 9,283,852 B2 * | 3/2016 | Jefferies | .................. | B60L 53/31 |
| 10,340,709 B2 * | 7/2019 | Dyer | .................... | H01M 10/443 |
| 10,515,742 B1 * | 12/2019 | de Bock | .............. | H02G 3/0616 |
| 10,630,082 B1 * | 4/2020 | Gu | ........................... | B60L 53/14 |
| 10,717,367 B1 * | 7/2020 | Price | ........................ | B60L 53/14 |
| 10,861,619 B2 * | 12/2020 | Lee | .......................... | B60L 50/60 |
| 11,024,894 B2 * | 6/2021 | Terwilliger | ........ | H02J 7/007192 |
| 11,180,044 B2 | 11/2021 | Maeshiro | | |
| 11,180,253 B1 * | 11/2021 | Seeley | ................... | B64D 27/24 |
| 11,548,407 B2 | 1/2023 | Villanueva | | |
| 11,584,250 B1 * | 2/2023 | Palombini | .............. | H02J 7/0045 |
| 11,613,185 B1 * | 3/2023 | Wiegman | ................ | B64D 27/24 320/109 |
| 11,628,746 B1 * | 4/2023 | Pill | .......................... | B60L 53/18 320/109 |
| 11,648,843 B2 * | 5/2023 | Graham | ................. | B64D 39/02 700/259 |

(Continued)

FOREIGN PATENT DOCUMENTS

| | | |
|---|---|---|
| CN | 212056266 U | 12/2020 |
| WO | 2021/062305 A1 | 4/2021 |

*Primary Examiner* — Alexander Gilman
(74) *Attorney, Agent, or Firm* — Hoffman Warnick LLC

(57) ABSTRACT

An apparatus for a locking thermal conditioning hose for an electric aircraft, the apparatus comprising a thermal conditioning hose comprising a thermal medium flow path configured to contain a flow of a thermal medium, a thermal medium return path, the thermal medium return path configured to contain a flow of the thermal medium from an electric aircraft, and a mating component, wherein the mating component is configured to make a connection with an electric aircraft port, and a thermal latch, wherein the thermal latch is configured to couple the thermal conditioning hose to the electric aircraft.

18 Claims, 14 Drawing Sheets

(56) References Cited

U.S. PATENT DOCUMENTS

| | | | | |
|---|---|---|---|---|
| 11,654,787 B1* | 5/2023 | Palombini | ............... | B64F 1/362 |
| | | | | 320/109 |
| 11,685,550 B1* | 6/2023 | Pill | ........................ | B64F 1/20 |
| | | | | 320/109 |
| 11,728,532 B1* | 8/2023 | Lohe | ................ | H01M 10/6556 |
| | | | | 429/120 |
| 11,801,773 B1* | 10/2023 | Overfield | ................ | B60L 58/26 |
| 11,840,360 B1* | 12/2023 | Williams | ................ | B60L 58/10 |
| 11,850,961 B1* | 12/2023 | Hall | ..................... | B60L 53/302 |
| 11,855,469 B1* | 12/2023 | Foland | .................... | B64F 1/362 |
| 2010/0072946 A1* | 3/2010 | Sugano | ................ | B60L 53/305 |
| | | | | 320/108 |
| 2012/0005031 A1* | 1/2012 | Jammer | ................ | B60L 53/30 |
| | | | | 705/16 |
| 2019/0135133 A1* | 5/2019 | Miller | .................... | B60L 53/34 |
| 2019/0210479 A1* | 7/2019 | Bachmann | ........... | G05D 1/0291 |
| 2019/0217731 A1* | 7/2019 | Rönfanz | ................ | H01R 31/06 |
| 2022/0285758 A1 | 9/2022 | Ziegler | | |
| 2023/0054124 A1* | 2/2023 | Wiegman | ................ | B60L 53/16 |
| 2023/0278439 A1* | 9/2023 | Straßer | ................ | H02J 7/0042 |
| | | | | 701/49 |
| 2023/0327463 A1* | 10/2023 | Wiegman | ................ | B60L 53/16 |

* cited by examiner

APPARATUS FOR A LOCKING THERMAL CONDITIONING HOSE FOR AN ELECTRIC AIRCRAFT AND METHOD OF USE

FIELD OF THE INVENTION

The present invention generally relates to the field of thermal conditioning devices for electronic aircrafts. In particular the present invention relates to a thermal conditioning connecter having a thermal latch.

BACKGROUND

Electric vehicles hold great promise in their ability to run using sustainably source energy, without increase atmospheric carbon associated with burning of fossil fuels. However various components may need to be heated or cooled while maintaining electric vehicles. Heating of cooling these components require gases or fluids that can cause spillage.

SUMMARY OF THE DISCLOSURE

In an aspect, an apparatus for a locking thermal conditioning hose for an electric aircraft is provided. Apparatus includes a thermal conditioning hose. Thermal conditioning hose includes a thermal medium flow path configured to contain a flow of a thermal medium, a thermal medium return path, the thermal medium return path configured to contain a flow of the thermal medium from an electric aircraft, and a mating component, wherein the mating component is configured to make a connection with an electric aircraft port. Apparatus further includes a thermal latch, wherein the thermal latch is configured to couple the thermal conditioning hose to the electric aircraft.

In another aspect, a method of locking a thermal conditioning hose to an electric aircraft is provided. The method includes receiving a thermal conditioning hose, wherein the thermal conditioning hose includes a thermal medium flow path configured to contain a flow of a thermal medium, a thermal medium return path, the thermal medium return path configured to contain a flow of the thermal medium from an electric aircraft and a mating component, wherein the mating component is configured to make a connection with an electric aircraft port. The method further includes connecting the thermal conditioning hose to the electric aircraft and coupling, using a thermal latch, the thermal conditioning hose to the electric aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for locking a thermal conditioning hose to an electric aircraft and corresponding methods of use for the apparatus. In an embodiment, aspects relate specifically to an apparatus having a thermal conditioning hose and a thermal latch wherein the thermal latch can couple or lock the thermal conditioning hose to an electric aircraft. Apparatus may include sensors to detect connecting properties and/or sensors to detect term tampering properties. Apparatus may further include an electronic latch wherein thermal conditioning hose may be coupled or uncoupled from electric aircraft using a remote device or a computing device. For example, and without limitation, electronic latch may uncouple from electric aircraft after receiving a coupling command.

Aspects of the present disclosure can be used to prevent unwanted uncoupling of thermal conditioning hose from electric aircraft. Aspects of this disclosure can further be used to uncouple thermal conditioning hose from electric aircraft when an uncoupling event occurs.

Figure 1:
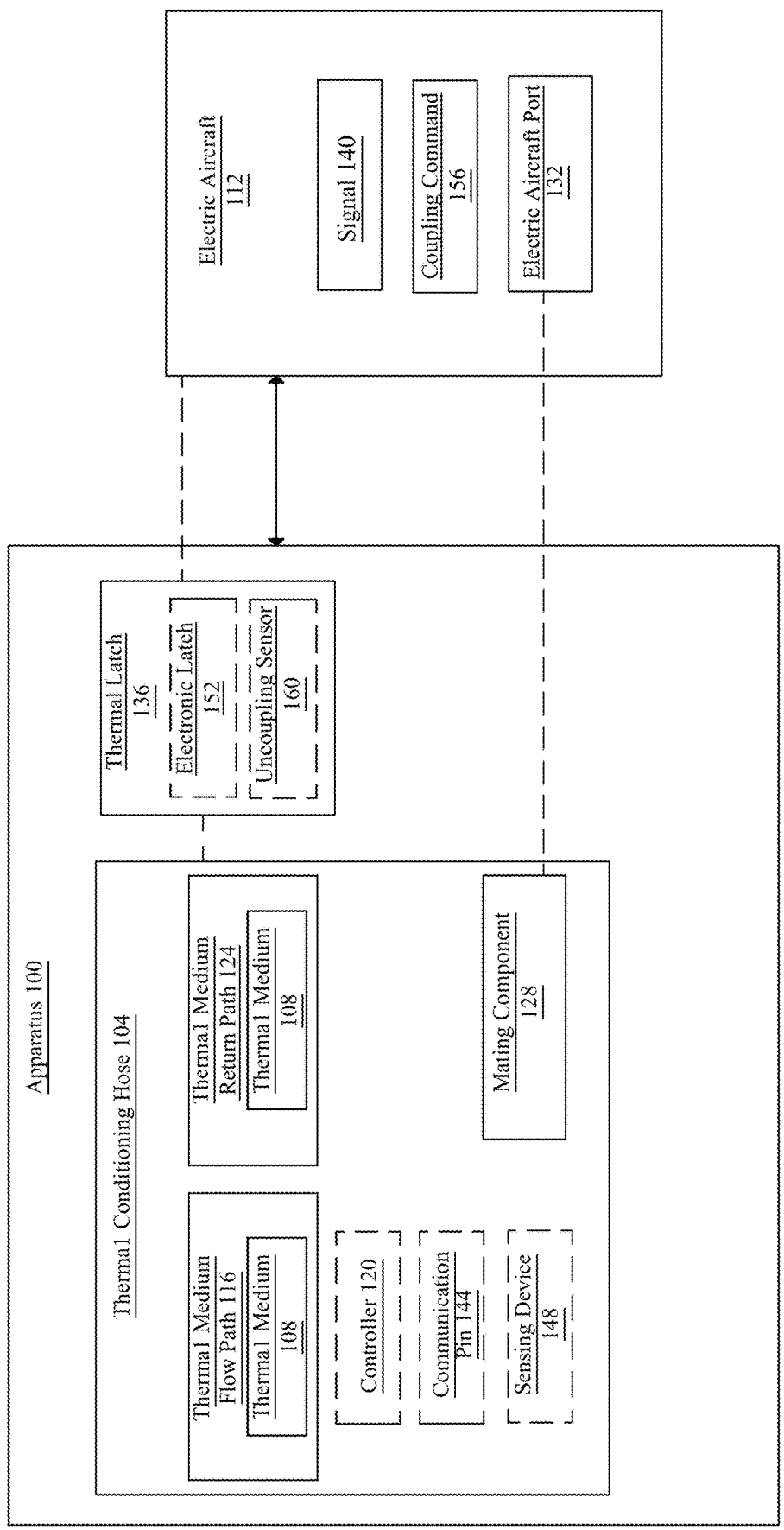
FIG. 1 is a block diagram illustrating an exemplary embodiment of an apparatus for a locking thermal conditioning hose for an electric aircraft.

Referring now to FIG. 1, a block diagram illustrating an exemplary embodiment of an apparatus for a locking thermal conditioning hose for an electric aircraft is illustrated. Apparatus 100 includes a thermal conditioning hose 104. Thermal conditioning hose 104 facilitates transfer of a thermal medium 108 between a thermal medium supply and electric aircraft 112.

With continued reference to FIG. 1, apparatus 100 includes a thermal conditioning hose 104. Thermal conditioning hose 104 includes a thermal medium flow path 116 configured to contain a flow of a thermal medium 108. "Thermal medium" as described herein is a material configured to provide heat or remove heat from an object or device. For example, thermal medium 108, may include a coolant wherein the coolant is configured to cool an electric aircraft 112 battery. In another non limiting example, thermal medium 108 may include a heated liquid such as water, wherein the heated liquid is configured to heat up an electric aircraft 112 component. In some embodiments, thermal medium 108 includes a coolant, such as air, water, water-glycol mix, anti-freeze, Fluorinert, ethylene glycol, propylene glycol, any combination thereof, and the like. In some embodiments, thermal medium 108 may include a fluid. Thermal medium 108 may further include any coolant as described in this disclosure. Thermal medium 108 may include any flowable heat transfer medium. Thermal medium 108 may further include a compressible fluid or a non-compressible fluid. Thermal medium 108 may further include compressed air, liquid, liquid coolant, gas coolant, and the like. Thermal medium 108 may include a non-electrically conductive liquid such as a fluorocarbon-based fluid, such as without limitation Fluorinert from 3M of Saint Paul, Minnesota, USA. In some cases, thermal medium 108 may include air. "Thermal medium flow path" as described herein is a component that is substantially impermeable to a thermal medium 108 and contains and/or directs a thermal medium flow. As described in this disclosure "flow of thermal medium" is a stream of thermal medium 108. In some embodiments, thermal medium flow path 116 may include any component responsible for the flow of thermal medium 108 into and/or out of electric aircraft 112. In some cases, thermal medium 108 may solely cool aircraft components and/or an aircraft charging cable as described in this disclosure. Thermal medium flow path 116 may be configured to flow thermal medium 108 into electric aircraft 112. Thermal medium flow path 116 may include any component, such as a sensor, responsible for transmitting signals describing a heating or cooling of electric aircraft 112 or charging connector, such as cooling requirements, current temperature, maximum and/or minimum temperature, and the like. Thermal medium flow path 116 may assist in rapid charging of an energy source of electric aircraft 112 such that coolant assistants in cooling down the electrical components to aid in faster charging. Flow of thermal medium 108 through thermal medium flow path 116 may be initiated by a controller 120 as will described in further detail below. Controller 120 may initiate and/or terminate a flow of thermal medium 108 through thermal medium flow path 116 as a function of detected data by a sensor of the connector or a sensor of electric aircraft 112, as discussed further below in this disclosure. Thermal conditioning hose 104 may be consistent with a cooling cable as described below.

With continued reference to FIG. 1, apparatus 100 further includes a thermal medium return path 124. "Thermal medium return path" as described herein is a material substantially impermeable to thermal medium 108 and contains and/or directs a thermal flow from electric aircraft 112.

In some cases, thermal medium return path 124 receives thermal medium 108 from electric aircraft 112. Additionally, or alternatively, thermal medium return path 124 may receive thermal medium 108 from thermal medium flow path 116. In some embodiments, thermal medium 108 within thermal medium return path 124 may contain a higher or lower temperature than thermal medium flow path 116. In some cases, thermal medium return path 124 may include thermal medium 108 having substantially similar temperature to thermal medium 108 within thermal medium flow path 116. In some embodiments, thermal medium return path 124 may return thermal medium 108 back to a thermal source. In some embodiments, thermal medium 108 may control the flow of thermal medium 108 to another source to be disposed of.

Figure 4:
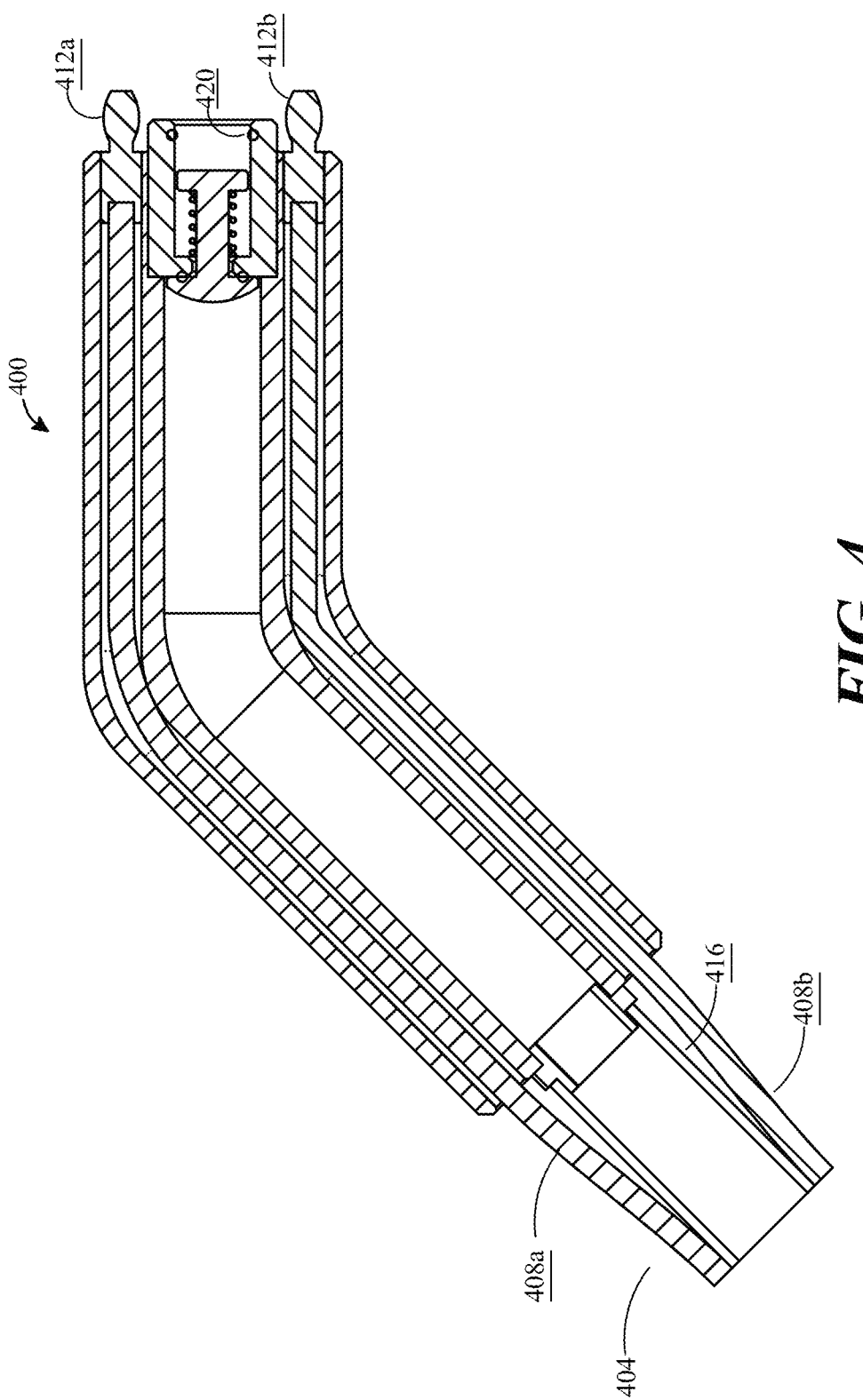
FIG. 4 is a cross-sectional view of an exemplary schematic of an exemplary connector for charging an electric vehicle in accordance with one or more embodiments of the present disclosure.

With continued reference to FIG. 1, thermal conditioning hose 104 contains a mating component 128, wherein mating component 128 is configured to make a connection with an electric aircraft port 132. As used in this disclosure, a "mating component" is a device or mechanism that allows an action of attaching two or more components together. In some cases, thermal conditioning hose 104 contains mating component 128 such that thermal conditioning hose 104 can mate with an electric aircraft port 132. As used in this disclosure, a "port" is a connection point and/or interface of an electric aircraft 112 that allows a thermal medium 108 and/or electrical power to be transferred between electric aircraft 112 and another component, such as apparatus 100. Port 132 may be consistent with or complementary to mating component 128. Mating component 128 may include any mechanical or electromechanical mechanism described in this disclosure. For example, without limitation mating may include an electromechanical device used to join two flow paths, two hoses, two fluid channels, and the like in order to create a singular flow path between two components. In some cases, mating component 128 may include gendered mating components. Gendered mating component may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of a connector. In some cases, mate may be lockable. Electric aircraft port 132 may contain a thermal medium flow path 116 as well to receive thermal medium 108. Thermal medium flow path 116 within electric aircraft 112 may be used to cool components such as batteries. In addition, thermal medium flow path 116 may be used to heat or cool an electric aircraft 112 cabin when the electric aircraft 112 is stationary. Electric aircraft port 132 may further contain thermal medium return path 124 to return thermal medium 108. In some embodiments, mating component 128 may include a seal. As used in this disclosure, a "seal" is a component that is substantially impermeable to a substance (e.g., coolant, air, and/or water) and is designed and/or configured to prevent flow of that substance at a certain location, e.g., joint. Seal may be configured to seal thermal medium 108. In some cases, seal may include at least one of a gasket, an O-ring, a mechanical fit (e.g., press fit, or interference fit), and the like. In some cases, seal may include an elastomeric material, for example without limitation silicone, buna-N, fluoroelastomer, fluorosilicone, polytetrafluoroethylene, polyethylene, polyurethane, rubber, ethylene propylene diene monomer, and the like. In some cases, seal may include a compliant element, such as without limitation a spring or elastomeric material, to ensure positive contact of seal with a sealing face. In some cases, seal may include a piston seal and/or a face seal. As used in this disclosure, a "joint" is a transition region between two components. For example, in some cases, thermal medium flow path 116 may have a joint located between thermal conditioning hose 104 and an electric aircraft port 132. In some embodiments, thermal medium flow path 116 may include a valve. Valve may include any type of valve, for example a mechanical valve, an electrical valve, a check valve, or the like. In some cases, valve may include quick disconnect. In some cases, valve may include a normally closed valve, for example a mushroom-poppet style valve, as shown in FIG. 4. Additional non-limiting examples of normally closed valves include solenoid valves, a spring-loaded valve, and the like. In some cases, a valve may include one or more of a ball valve, a butterfly valve, a body valve, a bonnet valve, a port valve, an actuator valve, a disc valve, a seat valve, a stem valve, a gasket valve, a trim valve, or the like. In some cases, valve may be configured to open when a connector is attached to port and/or when thermal medium 108, in particular, is mated with a mating component 128 within port. In some cases, valve may be automatically opened/closed, for example by a controller 120 as described in this disclosure. In some cases mating component 128 may include a thermal latch 136 as described in this disclosure. In some cases, mating component 128 may be a separate or distinct component from thermal latch 136 as described in this disclosure. In some cases, thermal latch 136 includes mating component 128.

With continued reference to FIG. 1, apparatus 100 and/or thermal conditioning hose 104 may include a controller 120. Controller 120 may include any computing device as described in this disclosure, including without limitation a microcontroller 120, microprocessor, digital signal processor (DSP), control circuit, and/or system on a chip (SoC) as described in this disclosure. Computing device may include, be included in, and/or communicate with a mobile device such as a mobile telephone or smartphone. Controller 120 may include a single computing device operating independently, or may include two or more computing device operating in concert, in parallel, sequentially or the like; two or more computing devices may be included together in a single computing device or in two or more computing devices. Controller 120 may interface or communicate with one or more additional devices as described below in further detail via a network interface device. Network interface device may be utilized for connecting controller 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 120 may include but is not limited to, for example, a computing device or cluster of computing devices in a first location and a second computing device or cluster of computing devices in a second location. Controller 120 may include one or more computing devices dedicated to data storage, security, distribution of traffic for load balancing, and the like. Controller 120 may distribute one or more computing tasks as described below across a plurality of computing devices of computing device, which may operate in parallel, in series, redundantly, or in any other manner used for distribution of tasks or memory between computing devices. Controller 120 may be implemented using a "shared nothing" architecture in which data is cached at the worker, in an embodiment, this may enable scalability of thermal conditioning hose 104 and/or computing device.

With continued reference to FIG. 1, controller 120 may be designed and/or configured to perform any method, method step, or sequence of method steps in any embodiment described in this disclosure, in any order and with any degree of repetition. For instance, controller 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In some embodiments, controller 120 may be configured to receive a signal 140. Controller 120 may perform one or more signal processing steps on a signal. For instance, sensor, circuit or controller 120 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers.

Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, flow of thermal medium 108 through thermal medium flow path 116 may be initiated by controller 120. Controller 120 may initiate and/or terminate a flow of thermal medium 108 through thermal medium flow path 116 as a function of detected data by a sensor located on connector or a sensor located on electric aircraft 112, as discussed further below in this disclosure.

With continued reference to FIG. 1, apparatus 100 and/or thermal conditioning hose 104 may further contain a communication pin 144, the communication pin 144 configured to receive a signal 140 from a remote device. "Communication pin" as described herein is a device that is configured to communicate with a device, such as a remote device as described in this disclosure. In some cases, communication pin 144 may be configured to communicate with electric aircraft 112. Communication pin 144 may communicate by way of at least a conductor, such as within limitation a control signal conductor. Alternatively, and/or additionally, in some cases, communication pin 144 may be communicative by at least a network, for example any network described in this disclosure including wireless (Wi-Fi), controller area network (CAN), the Internet, and the like. In some cases, communication pin 144 may receive signal 140, wherein signal 140 is a set of commands received from a remote device. In some cases, communication pin 144 may be consistent with controller 120. In some cases, communication pin 144 may be communicatively connected to controller 120. In some cases, communication pin 144 may include a component of controller 120 such as a network interface device wherein the communication pin 144 is utilized to connect controller 120 to one or more networks or remote devices. In some cases, communication pin 144 may be configured to receive a signal 140 from remote device. In some cases, signal 140 may include a command wherein connector may be configured to execute an action or a process as a function of the command. Controller 120 may be further configured to control thermal flow as a function of signal 140 from communication pin 144 and/or a command. Command will be described in further detail below.

With continued reference to FIG. 1, apparatus 100 may include a sensing device 148, wherein controller 120 may be communicatively connected to sensing device 148. "Sensing device" as described herein is a sensor, or a device containing a sensor. Sensing device 148 may include any sensor that may detect a physical or electrical property. Sensing device 148 may include a single sensor or a plurality of sensors. Sensing device 148 may include a humidity sensor, wherein humidity sensor is a sensor capable of detecting a fluid in the form of vapor present within a gaseous medium. Humidity sensor may be psychrometer. Humidity sensor may be a hygrometer. Humidity sensor may be configured to act as or include a humidistat. A "humidistat", for the purposes of this disclosure, is a humidity-triggered switch, often used to control another electronic device. Humidity sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell. Sensing device 148 may further contain a multimeter, wherein the multimeter is configured to measure voltage across a component, electrical current through a component and resistance of a component. Sensing device 148 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensing device 148, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection. Sensing device 148 may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft 112. Byproducts of catastrophic cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensing device 148, may be configured to detect combustible, flammable, toxic, oxygen depleted, a combination thereof, or another type of gas alone or in combination. The gas sensor that may be present in sensing device 148 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensing device 148 may include sensors that are configured to detect non-gaseous byproducts of catastrophic cell failure including, in non-limiting examples, liquid chemical leaks including aqueous alkaline solution, ionomer, molten phosphoric acid, liquid electrolytes with redox shuttle and ionomer, and salt water, among others. Sensing device 148 may include sensors that are configured to detect non-gaseous byproducts of catastrophic cell failure including, in non-limiting examples, electrical anomalies as detected by any of the previous disclosed sensors or components. Sensing device 148 may further contain any sensor as described in this disclosure.

With continued reference to FIG. 1, sensing device 148 may be configured to detect a connecting property. "Connecting property" as described herein refers to the connection between apparatus 100 and/or thermal conditioning hose 104 and electric aircraft 112. Connecting property may include any physical or electrical event that may signify the mating or un mating of mating component 128 to electric aircraft port 132. For example, connecting property may include a pressure property, wherein sensing device 148 is configured to detect changes in pressure. A change in pressure may indicate that thermal conditioning hose 104 and/or apparatus 100 is not mated or not properly mated to electrical aircraft. Connecting property may further include an improper connection with electric aircraft 112. Connecting property may include, pressure data, humidity data, flow rate data, voltage data, temperature data, data relating to detecting unknown or irregular substances within thermal medium flow path 116 and the like. Connecting property may be used to signify to controller 120 and/or a computing device that apparatus 100 and/or thermal conditioning hose 104 is not connected or not properly connected to electrical aircraft. In addition, sensing device 148 may detect a connecting property such that controller 120 may start or stop the flow of thermal medium 108 as a function of connecting property. For example, when sensing device 148 detects a change in pressure signifying a leak, or the un-mating of apparatus 100, controller 120 may stop the flow of thermal medium 108 to electric aircraft 112. similarly, if sensing device 148 detects a foreign or unknown substance, controller 120 may inhibit the flow of thermal medium 108. In some cases, sensing device 148 may be configured to receive a tampering property. "Tampering property" as described herein refers to a physical property indicating that the apparatus 100, thermal conditioning hose 104 and/or electrical aircraft has been tampered with. For example, tampering property may include pressure data wherein the pressure data may signify that the apparatus 100 and/or thermal conditioning hose 104 is being tampered with. Tampering property may further include properties related to electric aircraft 112 such as when a user may be operating aircraft without proper approval. Tempering property may include sensing the powering of an aircraft through voltage changes, sensing the movement of an aircraft using an accelerometer or a GPS, and the like. In some cases, sensing device may include a proximity sensor that may be configured to detect if the thermal connector is connected. Proximity sensor may be used to detect that thermal conditioning hose 104 is connected to electric aircraft 112/electric aircraft port 132. In some cases, sensing device 148 may include a proximity pin. "Proximity pin" as described herein is a component used to signify that thermal conditioning hose is connected to electric aircraft. Proximity pin may include a pin that is configured to mate with a component on electric aircraft wherein the mating of components signifies that thermal conditioning hose 104 is connected to electric aircraft. Proximity pin may include voltage sensors or current sensors, wherein the presence of a voltage or a current may indicate that proximity pin is in contact with electric aircraft 112. Additional disclosure on proximity sensor and/or proximity pin is disclosed in Nonprovisional application Ser. No. 17/884,397, filed on Aug. 9, 2022, entitled "APPARATUS FOR AUTHORIZING AN ELECTRIC AIRCRAFT TO CHARGE AT A CHARGING STRUCTURE AND A METHOD FOR ITS USE,", the entirety of which is incorporated herein by reference.

With continued reference to FIG. 1, apparatus 100 further includes a thermal latch 136, wherein thermal latch 136 is configured to couple thermal conditioning hose 104 to electric aircraft 112. "Thermal latch" as described herein is a coupling component configured to couple thermal conditioning hose 104 to electric aircraft 112. "couple" as described herein refers to the locking of two or more components together such that they are fixedly attached until they are unlocked. In a non-limiting example, thermal conditioning hose 104 may be coupled to electric aircraft 112 such that thermal conditioning hose is fixedly attached to electric aircraft until thermal conditioning hose is unlocked or uncoupled. Thermal latch 136 may couple thermal conditioning hose 104 to electric aircraft 112 such that thermal conditioning hose 104 is locked to electric aircraft 112. Thermal latch 136 may lock thermal conditioning hose 104 to electric aircraft 112 wherein thermal conditioning hose 104 may be fixedly attached to electric aircraft 112. Thermal latch 136 may be configured to lock thermal conditioning hose 104 to electric aircraft 112 wherein thermal conditioning hose 104 may only be unlocked or removed from electric aircraft 112 upon the occurrence of event. Thermal latch 136 may include a twist lock. Thermal latch 136 may include any mating component 128 located on thermal conditioning hose 104 that is configured to latch onto a mating component 128 of electric aircraft 112, such as for example, electric aircraft port 132. Thermal latch 136 may further conclude a buckle mated with a locking component. Thermal latch 136 may include the latching components mentioned above or any latching components as described in this disclosure. Thermal latch 136 may further include a fastener. As used in this disclosure, a "fastener" is a physical component that is designed and/or configured to attach or fasten two or more components together. Apparatus 100 may include one or more attachment components or mechanisms, for example without limitation fasteners, threads, snaps, canted coil springs, and the like. In some cases, apparatus 100 may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, thermal latch 136 may couple thermal conditioning hose 104 to electric aircraft 112 by way of magnetic force. For example, thermal latch 136 may include one or more of a magnetic, a ferro-magnetic material, and/or an electromagnet. Fastener may be configured to provide removable attachment between apparatus 100 and port of electric aircraft 112. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata. In some cases, thermal latch 136 is removably attached to thermal conditioning hose 104. In some cases, thermal latch 136 may be a separate or distinct component from thermal conditioning hose 104 wherein thermal latch 136 may couple thermal conditioning hose 104 to electric aircraft 112. In some cases, thermal latch 136 may be fixedly attached to thermal conditioning hose 104. In some cases, thermal latch 136 and thermal conditioning hose 104 comprise a single component.

With continued reference to FIG. 1, thermal latch 136 may include a manual latch wherein coupling and uncoupling of apparatus 100 from electric aircraft 112 may be done manually. Manual latch may include any latch as described above wherein a user or an operator may need to be present at or near a site of the vehicle port in order to couple and uncouple thermal conditioning hose 104 to and from electric aircraft 112. In some cases, thermal latch 136 and/or apparatus 100 may include an engagement feature. "Engagement feature" is a component that may be used to engage with thermal latch 136 in order to couple or uncouple thermal conditioning hose 104 form aircraft. In some cases, engagement feature is configured for manual engagement of thermal latch 136. Engagement feature may include a handle wherein engagement of the handle may couple or uncouple thermal latch 136. Engagement feature may further include a push button, a release button, a releasing feature, or any other mechanism that may be used to unlatch thermal conditioning cable from electric aircraft 112. Engagement feature may further include an engagement feature on a computing device or a remote device wherein activation of the engagement feature will uncouple thermal conditioning hose 104 from electric aircraft 112. In some embodiments, engagement feature may include an electronically driven motor wherein activation of the motor couples or uncouples thermal conditioning hose 104 to electric aircraft 112. In some cases, engagement feature may include a handle wherein gripping of the handle allows a user to engage with thermal latch 136. In some cases, engagement feature includes a combination lock, wherein the combination lock must be unlocked before engaging with thermal latch 136. In some cases, engagement feature may comprise an electronic lock located on a device display wherein a pin or passcode must be entered on the device display to activate or engage with thermal latch 136.

With continued reference to FIG. 1, thermal latch 136 may include an electronic latch 152, wherein the electronic latch 152 is an electronically driven latch to secure two components. Electronic latch 152 may include a power supply wherein the power supply acts as a power source to drive electronic latch 152. Electronic latch 152 may further include a motor, an actuator or any other electronically driven components that may be used to power or drive electronic latch 152. Electronic latch 152 may further include a latching component as described in this disclosure that is driven by a motor or an actuator. Electronic latch 152 may further contain control system and/or a computing device wherein control system and/or computing device controls the coupling and uncoupling mechanism of thermal latch 136. In some cases, computing device of thermal latch 136 may include controller 120 as described in this disclosure. In some cases, controller 120 may be configured to control uncoupling and coupling of electronic latch 152. In some cases, electronic latch 152 may be configured to couple the thermal conditioning hose 104 to the electronic aircraft as a function of receiving a coupling command 156. As described in this disclosure a "command" is an instruction given to a computing system or a computing device to perform a specific task. As described in this disclosure "coupling command" is an instruction given to controller 120 to couple or uncouple electronic latch 152. Coupling command 156 may be received from a remote device as described in this disclosure. Coupling command 156 may further be received from electric aircraft 112, wherein an operator within electric aircraft 112 may send coupling command 156 to controller 120. In some cases, coupling command 156 may be sent upon the occurrence of an event. For example, a computing device and/or electric aircraft 112 may send coupling command 156 once battery charging on electric aircraft is complete. A computing device on electric aircraft 112 may determine that the battery on electric aircraft has completed charging and/or has stopped charging wherein coupling command 156 may be sent as a result. In some cases, coupling command 156 may be sent when a battery on electric aircraft 112 has reached a predetermined temperature. A battery may reach a predetermined temperature when charging is complete wherein battery may no longer contain an elevated temperature. Alternatively, a predetermined increase in temperature may indicate that battery is malfunctioning wherein coupling command 156 may be sent as well. In some cases, coupling command 156 may be received from communication pin 144 of apparatus 100. In some cases, coupling command 156 may be sent by activating a button, switch, or the like on electric aircraft 112 indicating that controller 120 should couple or uncouple apparatus 100 from electronic aircraft. In some cases, coupling command 156 may be sent or entered through a user interface, such as a website or a mobile application wherein a user may interact with the user interface to send coupling command 156 to controller 120. In some cases, a software or a program on controller 120 may execute coupling command 156 when coupling command 156 is received. In some cases, a device display may be located on a surface and/or a handle of apparatus 100. Additionally, or alternatively commands may be sent and/or entered through device display. Device display may be consistent with any device display as described in this disclosure. In some cases, thermal conditioning hose 104 and/or controller 120 contains communication pin 144 described above wherein communication pin 144 is configured to receive coupling command 156 from electric aircraft 112.

With continued reference to FIG. 1, thermal latch 136 may further comprise an uncoupling sensor 160. "Uncoupling sensor" as described herein is a sensor used to detect various properties of apparatus 100 that may result in uncoupling of thermal conditioning hose 104 from electric aircraft 112. uncoupling sensor 160 may be configured to uncouple thermal conditioning hose 104 from electric aircraft 112 upon the occurrence of an uncoupling event. "Uncoupling event" as described herein is an event that may signify to controller 120 to uncouple thermal latch 136, thereby uncoupling thermal conditioning hose 104 from electric aircraft 112. Uncoupling event may include a plurality of events in which the coupling of thermal conditioning hose 104 to electric aircraft 112 may not be suitable or safe. In a non-limiting example, an uncoupling event may occur when sensor detects a leak in thermal conditioning hose 104. Uncoupling event may include a leak in thermal conditioning hose 104, a fire, electrical failure, battery cell failure, turning on the aircraft, movement of the aircraft, tampering of thermal conditioning hose 104, a decrease on pressure and the like. Uncoupling sensor 160 may be configured to sense an uncoupling event by sensing properties that may be associated with an uncoupling event. Uncoupling sensor 160 may include a temperature sensor wherein temperature sensor may detect a rise in temperature indicating a fire or some sort of failure. Uncoupling sensor 160 may also include a humidity sensor wherein detection of a rise, or an increase in humidity may signify that a leak is occurring. Sensor may further include a voltage sensor, wherein a drop in voltage may indicate power failure on electric aircraft 112. uncoupling sensor 160 may further include a chemical sensor wherein the presence of unknown or foreign substances may indicate failure of a component. Sensor may further include any sensor that may be used to detect an uncoupling event. Uncoupling sensor 160 may be configured to uncouple thermal conditioning hose 104 by receiving uncoupling data from the uncoupling sensor 160. A computing device, such as controller 120 may receive the uncoupling data and determine, based on the uncoupling data whether a n coupling event has occurred. If an uncoupling event has occurred, controller 120 may uncouple thermal latch 136. A computing device and/or controller 120 may determine an uncoupling event by comparing uncoupling data to a predetermined threshold. Predetermined threshold may include a threshold, that is surpassed may indicate an uncoupling event. For example, predetermined threshold may include a temperature threshold wherein predetermined rise in temperature may indicate a fire, thereby indicating an uncoupling event. Predetermined threshold may include a plurality of thresholds that may be used to determine an uncoupling event based on uncoupling data received form uncoupling sensor 160.

With continued reference to FIG. 1, apparatus 100 may further include a charging connector, wherein the charging connector is configured to charge electric aircraft 112. charging connector (also referred to herein as a "connector") facilitates transfer of electrical power between a power source of a charging station and an electric aircraft 112, such as a power source of the electric aircraft 112 and/or electrical systems of the electric aircraft 112. As used in this disclosure, "charging" refers to a process of increasing energy stored within an energy source. In some cases, and without limitation, an energy source may include a battery and charging may include providing electrical power, such as an electrical current, to the battery. Apparatus 100 may include a housing wherein charging connector and thermal conditioning hose 104 are situated within the same housing. In some cases, thermal conditioning house may thermally condition charging cable. For example, thermal conditioning hose 104 may cool charging connector components. Charging connector may include any charging cable or connector as described in this disclosure, such as the charging connector described in at least FIG. 2.

In some cases, thermal conditioning hose may be connected to ground service equipment wherein ground service equipment may be used to service electric vehicles such as electric aircraft 120. For the purposes of this disclosure, "ground service equipment," also called "GSE" is a service equipment that supports an operation of an electric vehicle whilst on the ground. The ground service equipment may support any electric vehicle or electric aircraft 120 disclosed herein. In some embodiments, the ground service equipment may be connected to the electric vehicle during a support. As a non-limiting example, the ground service equipment may be connected to electric aircraft 120 using thermal conditioning hose 104 or a cable module as described herein. In some embodiments, ground service equipment is configured to manage temperature of a power source of an electric aircraft 120. For the purposes of this disclosure, "temperature" is a measure of the heat energy of a system. Temperature may be measured in Fahrenheit (° F.), Celsius (° C.), Kelvin (° K), or another scale alone or in combination. In some cases, ground service equipment may be configured to manage temperature of the power source while charging electric aircraft 120. For the purposes of this disclosure, "charging" refers to a process of increasing energy stored within a power source. As a non-limiting example, the power source may include at least a battery and charging may include providing an electrical current to the at least a battery. In some embodiments, the ground service equipment may be configured to heat the power source while charging the electric aircraft 120. In some embodiments, the ground service equipment may be configured to cool the power source while charging the electric aircraft. As a non-limiting example, the power source may get heated while charging the power source, then the ground service equipment may be configured to cool the power source using a coolant. In some cases, ground service equipment includes a coolant source. For the purposes of this disclosure, a "coolant source" is an origin, generator, or reservoir of a coolant. In an embodiment, the coolant source may be external of the ground service equipment. In another embodiment, the coolant source may be inside of the ground service equipment. In some embodiments, the coolant source may include corrosion-resistant outer housing as the coolant source may come into contact with the liquid or material within the housing, such as without limitation the coolant. For the purposes of this disclosure, "corrosion-resistant" refers to the ability to protect the substrate from corrosion. As a non-limiting example, the corrosion-resistant outer housing may include stainless steel, aluminum alloy, nickel-chromium alloy, iron-chromium-aluminum alloy, molybdenum disilicide, silicon carbide, copper, polypropylene, Polytetrafluoroethylene (PTFE), and the like. Ground service equipment and cooling cable is further described in U.S. patent application Ser. No. 18/121,788, filed on Mar. 15, 2023, and entitled "A SYSTEM FOR THERMAL MANAGEMENT GROUND SERVICE EQUIPMENT AND A METHOD OF USE," which is incorporated in its entirety herein by reference. Additional disclosure on ground service equipment is further described in U.S. patent application Ser. No. 18/121,242, filed on Mar. 14, 2023, and entitled "AN APPARATUS AND A METHOD FOR AN INDICATING SYSTEM FOR GROUND SUPPORT EQUIPMENT FOR AN ELECTRIC AIRCRAFT," which is incorporated in its entirety herein by reference. Ground service equipment is described in further detail below in FIG. 11.

Figure 2A:
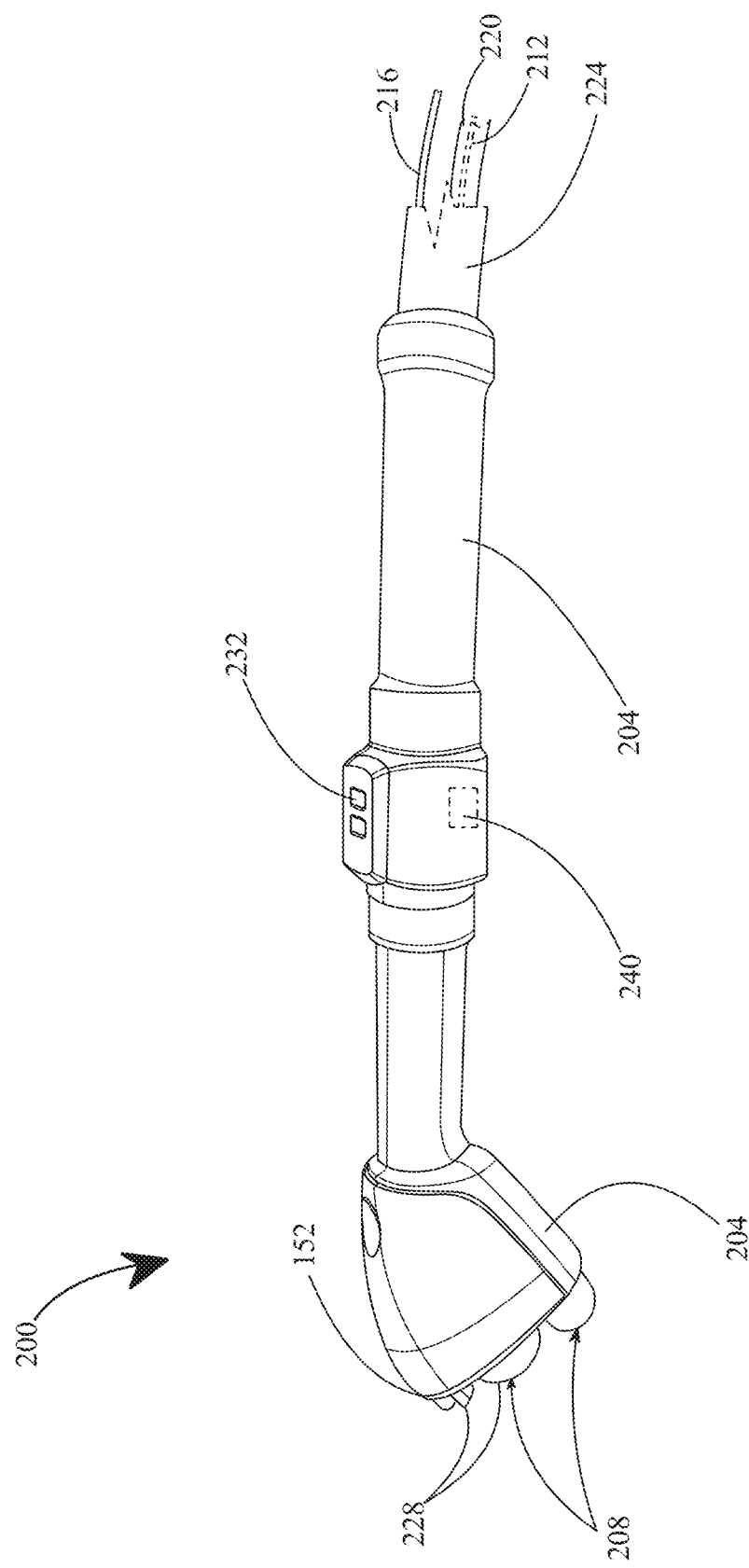
FIGS. 2A and 2B are exemplary schematics of an exemplary embodiment of a charging connector in accordance with one or more embodiments of the present disclosure.
Figure 2B:
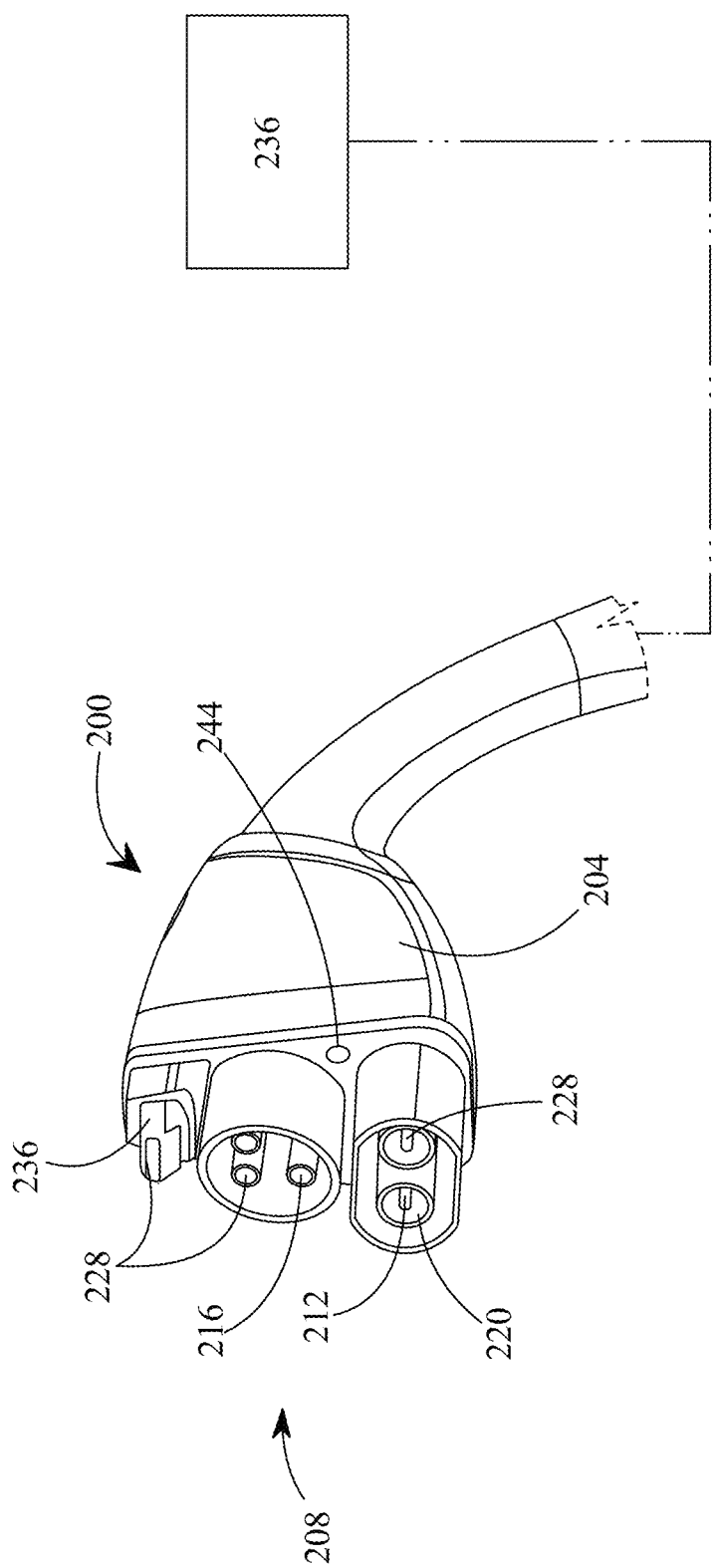

Referring now to FIGS. 2A and 2B, an exemplary embodiment of a charging connector with an integrated cooling channel is illustrated. As shown in FIG. 2A, charging connector 200 (also referred to herein as a "connector") facilitates transfer of electrical power between a power source of a charging station and an electric aircraft, such as a power source of the electric aircraft and/or electrical systems of the electric aircraft. As used in this disclosure, "charging" refers to a process of increasing energy stored within an energy source. In some cases, and without limitation, an energy source may include a battery and charging may include providing electrical power, such as an electrical current, to the battery.

In one or more embodiments, and still referring to FIG. 2A, connector 200 may include a distal end of a flexible tether 224 or a bundle of tethers, e.g., hose, tubing, cables, wires, and the like, attached to a charging unit, such as a charging station or charger. Connector 200 is configured to connect charging unit to an electric aircraft to create an electrical communication between charging unit and electric aircraft, as discussed further in this disclosure. Connector 200 may be configured to removably attach to a port of electric aircraft using, for example, a lo 228. As used in this disclosure, a "port" is an interface for example of an interface configured to receive another component or an interface configured to transmit and/or receive signal on a computing device. For example, and without limitation, in the case of an electric aircraft port, the port interfaces with a number of conductors 208 and/or a cooling channel 220 by way of receiving connector 200. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 2A, connector 200 may include a housing 204. As used in this disclosure, a "housing" is a physical component within which other internal components may be disposed at least partially within. In some cases, housing 204 may protect internal components of connector 200. Housing 204 may be made from various materials, such as metal alloy, aluminum, steel, plastic, synthetic material, semi-synthetic material, polymer, and the like. In some embodiments, housing 204 may be monolithic. In other embodiments, housing 204 may include a plurality of assembled components. Housing 204 and/or connector 200 may be configured to mate with a port of an electric aircraft using a mating component 228. As used in this disclosure, a "mating component" is a device or mechanism that allows an action of attaching two or more components together. As used in this disclosure, a "port" is a connection point and/or interface of an electric aircraft that allows electrical power to be transferred between electric aircraft and an external electrical device, such as a charging unit. Mating component 228 may include a mechanical or electromechanical mechanism described in this disclosure. For example, without limitation mating may include an electromechanical device used to join electrical conductors and create an electrical circuit. In some cases, mating component 228 may include gendered mating components. Gendered mating components may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 200. In some cases, mate may be lockable. In one or more embodiments, housing 204 may include controls 232. Controls 232 may be actuated by a user to initiate, terminate, and/or modify parameters charging. For example, and without limitation, a button of controls 232 may be depressed by a user to initiate a transfer of electrical power from charging unit to electric aircraft. Controls 232 may include buttons, switches, slides, a touchscreen, joystick, and the like. In some embodiments, controls 232 may include a screen that displays information related to the charging of an energy source. For example, and without limitation, screen may display an amperage or voltage of electrical power being transferred to energy source of electric aircraft. Screen may also display a calculated amount of time until energy source is charged to a desired amount (e.g., desired state of charge). Screen may also display data detected by components, such as a sensor, of connector and/or electric aircraft. For example, and without limitation, screen may display a temperature of an energy source of electric aircraft. In an exemplary embodiment, a user may actuate, for example, a switch, of control 232 to initiate a cooling of a component of connector 200 and/or electric aircraft in response to displayed information and/or data on screen of connector 200. Initiating of a cooling of one or more embodiments of connector 200 may include a coolant source displacing a coolant within a cooling channel, as discussed further in this disclosure below. Controlling a transmission of electrical power and/or charging of an electric aircraft using a connector may be consistent with charging described in U.S. Nonprovisional Application No. 27/405,840, filed on Aug. 28, 2022, and entitled "CONNECTOR AND METHODS OF USE FOR CHARGING AN ELECTRIC VEHICLE", U.S. Nonprovisional Application No. 27/407,358, filed on Aug. 20, 2022, and entitled "CONNECTOR AND METHOD FOR USE FOR AUTHORIZING BATTERY CHARGING FOR AN ELECTRIC VEHICLE", U.S. Nonprovisional application Ser. No. 17/515,508, filed on Oct. 31, 2021, and entitled "CONNECTOR WITH AMBIENCE MONITORING CAPABILITY AND METHODS OF USE FOR CHARGING AN ELECTRIC AIRCRAFT", the entirety of each one of which is incorporated herein by reference.

With continued reference to FIG. 2A, mating component 228 of housing 204 may include a fastener. As used in this disclosure, a "fastener" is a physical component that is designed and/or configured to attach or fasten two or more components together. Connector 200 may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferro-magnetic material, and/or an electro-magnet. Fastener may be configured to provide removable attachment between connector 200 and port of electric aircraft. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 2A, connector 200 may include a controller 240. Controller 240 may include any computing device as described in this disclosure, including without limitation a microcontroller, microprocessor, digital signal processor (DSP), control circuit, and/or system on a chip (SoC) as described in this disclosure. Computing device may include, be included in, and/or communicate with a mobile device such as a mobile telephone or smartphone. Controller 240 may include a single computing device operating independently, or may include two or more computing device operating in concert, in parallel, sequentially or the like; two or more computing devices may be included together in a single computing device or in two or more computing devices. Controller 240 may interface or communicate with one or more additional devices as described below in further detail via a network interface device. Network interface device may be utilized for connecting controller 240 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 240 may include but is not limited to, for example, a computing device or cluster of computing devices in a first location and a second computing device or cluster of computing devices in a second location. Controller 240 may include one or more computing devices dedicated to data storage, security, distribution of traffic for load balancing, and the like. Controller 240 may distribute one or more computing tasks as described below across a plurality of computing devices of computing device, which may operate in parallel, in series, redundantly, or in any other manner used for distribution of tasks or memory between computing devices. Controller 240 may be implemented using a "shared nothing" architecture in which data is cached at the worker, in an embodiment, this may enable scalability of connector 200 and/or computing device.

With continued reference to FIG. 2A, controller 240 may be designed and/or configured to perform any method, method step, or sequence of method steps in any embodiment described in this disclosure, in any order and with any degree of repetition. For instance, controller 240 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 240 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2A, connector 200 may include one or more charging cables that each include a conductor 208, which has a distal end approximately located within connector 200 and a proximal end approximately located at an energy source of charging unit. As used in this disclosure, a "conductor" is a component that facilitates conduction. As used in this disclosure, "conduction" is a process by which one or more of heat and/or electricity is transmitted through a substance, for example, when there is a difference of effort (i.e., temperature or electrical potential) between adjoining regions. In some cases, conductor 208 may be configured to charge and/or recharge electric aircraft. For instance, conductor 208 may be connected to an energy source of a charging unit and conductor may be designed and/or configured to facilitate a specified amount of electrical power, current, or current type. For example, conductor 208 may include a direct current conductor. As used in this disclosure, a "direct current conductor" is a conductor configured to carry a direct current for recharging an energy source of electric aircraft. As used in this disclosure, "direct current" is one-directional flow of electric charge. In some cases, conductor may include an alternating current conductor. As used in this disclosure, an "alternating current conductor" is a conductor configured to carry an alternating current for recharging an energy source of electric aircraft. As used in this disclosure, an "alternating current" is a flow of electric charge that periodically reverse direction; in some cases, an alternating current may change its magnitude continuously with in time (e.g., sine wave).

In one or more embodiments, and still referring to FIG. 2A, conductor 208 may include a high-voltage conductor 212. In a non-limiting embodiment, high-voltage conductor 212 may be configured for a potential no less than 200 V. In some embodiments, high-voltage conductor may include a direct current (DC) conductor. High-voltage conductor 212 may include a DC conductor pin, which extends from housing 204 and allows for the flow of DC power into and out of the electric aircraft via port. In other embodiments, high-voltage conductor 212 may include an alternating current (AC) conductor. An AC conductor may include any component responsible for the flow of AC power into and out of the electric aircraft. The AC conductor may include a pin that extends from housing 204 that may allow for a transfer of electrical power between connector and power source of electrical aircraft. In some embodiments, a pin of high-voltage conductor 212 may include a live pin, such that the pin is the supply of DC or AC power. In other embodiments, pin of high-voltage conductor 212 may include a neutral pin, such that the pin is the return path for DC or AC power.

With continued reference to FIG. 2A, conductor may include a low-voltage conductor 216. In a non-limiting embodiment, low-voltage conductor 216 may be configured for a potential no greater than 200 V. Low-voltage conductor 216 may be configured for AC or DC current. In one or more embodiments, low-voltage conductor 216 may be used as an auxiliary charging connector to power auxiliary equipment of electric aircraft. In some embodiments, auxiliary equipment may only be powered using low-voltage conductor 216 such that auxiliary equipment is not powered after charging, thus, auxiliary equipment may be off during in-flight activities.

With continued reference to FIG. 2A, high-voltage conductor 212 and low-voltage conductor 216 may receive an electrical charging current from an energy source of charging unit. As used in this disclosure, an "energy source" is a source of electrical power, for example, for charging a battery. In some cases, energy source may include a charging battery (i.e., a battery used for charging other batteries). A charging battery is notably contrasted with an electric aircraft energy source or battery, which is located for example upon electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Energy source may house a variety of electrical components. In one embodiment, energy source may contain a solar inverter. Solar inverter may be configured to produce on-site power generation. In one embodiment, power generated from solar inverter may be stored in a charging battery. In some embodiments, charging battery may include a used electric aircraft battery no longer fit for service in an aircraft.

In some embodiments, and still referring to FIG. 2A, charging battery may have a continuous power rating of at least 350 kVA. In other embodiments, charging battery may have a continuous power rating of over 350 kVA. In some embodiments, charging battery may have a battery charge range up to 950 Vdc. In other embodiments, charging battery may have a battery charge range of over 950 Vdc. In some embodiments, charging battery may have a continuous charge current of at least 350 amps. In other embodiments, charging battery may have a continuous charge current of over 350 amps. In some embodiments, charging battery may have a boost charge current of at least 500 amps. In other embodiments, charging battery may have a boost charge current of over 500 amps. In some embodiments, charging battery may include any component with the capability of recharging an energy source of an electric vehicle. In some embodiments, charging battery may include a constant voltage charger, a constant current charger, a taper current charger, a pulsed current charger, a negative pulse charger, an IUI charger, a trickle charger, and a float charger.

In one or more embodiments, and still referring to FIG. 2A, conductor 208 may be an electrical conductor, for example, a wire and/or cable, as previously mentioned above in this disclosure. Exemplary conductor materials may include metals, such as without limitation copper, nickel, steel, and the like. In one or more embodiments, conductor may be disposed within an insulation, such as an insulation sleeve that conductor is at least partially disposed within. For example, and without limitation, conductor 208 may be covered by insulation except for at conductor pin, which may contact a component or interface of port of electric aircraft as part of mating component 228. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

Now referring to FIG. 2B, in some embodiments, a charging unit may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric vehicle and conductors may provide an alternating current to the electric vehicle by way of conductors 208 and connector 200. Alternatively and/or additionally, in some cases, AC-DC converter may be located outside of electric aircraft and an electrical charging current may be provided by way of a direct current to the electric vehicle. In some cases, AC-DC converter may be used to recharge a charging batter. In some cases, AC-DC converter may be used to provide electrical power to one or more of coolant source 236, charging battery, and/or controller 240. In some embodiments, charging battery may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, charging battery may provide power to the grid power component. In this configuration, charging battery may provide power to a surrounding electrical power grid.

With continued reference to FIG. 2B, a conductor 208 may include a control signal conductor configured to conduct a control signal. As used in this disclosure, a "control signal conductor" is a conductor configured to carry a control signal, such as a control signal between an electric aircraft and a charging unit. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric vehicle (e.g., within an electric vehicle battery) and/or located within connector 200. For example, in some cases, control signal may be associated with a battery within an electric vehicle. For example, control signal may include a battery sensor signal. As used in this disclosure, a "battery sensor signal" is a signal representative of a characteristic of a battery. In some cases, battery sensor signal may be representative of a characteristic of an electric vehicle battery, for example as electric vehicle battery is being recharged. In some versions, controller 240 may additionally include a sensor interface configured to receive a battery sensor signal. Sensor interface may include one or more ports, an analog to digital converter, and the like. Controller 240 may be further configured to control one or more of electrical charging current and coolant flow as a function of sensor signal from a sensor 244 and/or control signal. For example, controller 240 may control a coolant source 236 and/or charging battery as a function of a battery sensor signal and/or control signal. In some cases, battery sensor signal may be representative of battery temperature. In some cases, battery sensor signal may represent battery cell swell. In some cases, battery sensor signal may be representative of temperature of electric vehicle battery, for example temperature of one or more battery cells within an electric vehicle battery. In some cases, a sensor, a circuit, and/or a controller 240 may perform one or more signal processing steps on a signal. For instance, sensor, circuit or controller 240 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 2B, a conductor 208 may include a ground conductor. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration.

With continued reference to FIG. 2B, connector 200 may include a cooling channel 220. Cooling channel 220 may have a distal end located substantially at connector 200, and cooling channel 220 may have a proximal end located at a coolant source 236, as discussed further below in this disclosure. As used in this disclosure, a "cooling channel" is a component that is substantially impermeable to a coolant and contains and/or directs a coolant flow. As used in this disclosure, "coolant" is any flowable heat transfer medium. Coolant may include a fluid, such as a liquid or a gas. Coolant may include a compressible fluid and/or a non-compressible fluid. Coolant may include compressed air, liquid coolant, gas coolant, and the like. Coolant may include a non-electrically conductive liquid such as a fluorocarbon-based fluid, such as without limitation Fluorinert™ from 3M of Saint Paul, Minnesota, USA. In some cases, coolant may include air. As used in this disclosure, a "flow of coolant" is a stream of coolant. In some cases, coolant may include a fluid and coolant flow is a fluid flow. Alternatively or additionally, in some cases, coolant may include a solid (e.g., bulk material) and coolant flow may include motion of the solid. Exemplary forms of mechanical motion for bulk materials include fluidized flow, augers, conveyors, slumping, sliding, rolling, and the like. In some cases, cooling channel 220 may be a separate component positioned within housing 204, such as a polymeric tube. In other cases, cooling channel 220 may be an integrated component, such as a molded component disposed within a housing 204 created using a mold form. In other cases, cooling channel 220 may be a combination of both an integrated component and a molded component. In one or more embodiments, cooling channel 220 may include any component responsible for the flow of coolant into and/or out of electric aircraft. Cooling channel 220 may solely cool (e.g., reduce a current temperature) connecter 200 such that the coolant flows through or next to the cables within the connector. For example, and without limitation, cooling channel may reduce the temperature of one or more conductors 208 of connector 200. Cooling channel 220 may include any component, such as a sensor, responsible for transmitting signals describing a cooling of electric aircraft or charging connector, such as cooling requirements, current temperature, maximum and/or minimum temperature, and the like. Cooling channel 220 may assist in rapid charging of an energy source of electric aircraft such that coolant assistants in cooling down the electrical components to aid in faster charging. Flow of coolant through cooling channel 220 may be initiated by controller 240. Controller 240 may initiate and/or terminate a flow of coolant through cooling channels 220 as a function of detected data by sensor 244 of connector 200 or a sensor of electric aircraft, as discussed further below in this disclosure.

In one or more embodiments, and still referring to FIG. 2B, high-voltage conductor 212 may be disposed within cooling channel 220 (also see FIG. 2A). For instance, and without limitation, high-voltage conductor may be disposed coaxially within cooling channel 220. Thus, high-voltage conductor may traverse along the center of cooling channel 220 so that coolant may surround high-voltage conductor 212 and reduce a temperature of high-voltage conductor 212 during charging of electric aircraft. Similarly, low-voltage conductor 216 may be coaxially disposed within cooling channel 220. Conductors 208 may all be disposed within cooling channel 220, each separated by an insulator, or conductors 208 may each be disposed within a corresponding cooling channel 220, wherein each cooling channel 220 is in fluidic communication with coolant source 236. In other embodiments, cooling channel 220 may abut one or more conductors 208 to cool conductors 208 and/or connector 200. For example, and without limitations, cooling channel 220 may physically abut at least one of the high-voltage conductor 212 and the low-voltage conductor 216.

In one or more embodiments, and still referring to FIG. 2B, cooling channel 220 may be in fluidic communication with coolant source 236. As used in this disclosure, a "coolant source" is an origin, generator, reservoir, or flow producer of coolant. In some cases, a coolant source 236 may include a flow producer, such as a fan and/or a pump. Coolant source 236 may include any of following non-limiting examples, air conditioner, refrigerator, heat exchanger, pump, fan, expansion valve, and the like. In some embodiments, coolant source 236 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source 236 includes a heat transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. In some versions, controller 240 may be further configured to control a temperature of coolant. For instance, in some cases, a sensor may be located within thermal communication with coolant, such that sensor is able to detect, measure, or otherwise quantify temperature of coolant within a certain acceptable level of precision. In some cases, sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to controller 240. Controller 240 may receive coolant temperature signal and control heat transfer between ambient air and coolant as a function of the coolant temperature signal. Controller 240 may use any control method and/or algorithm used in this disclosure to control heat transfer, including without limitation proportional control, proportional-integral control, proportional-integral-derivative control, and the like. In some cases, controller 240 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. In some embodiments, coolant flow may substantially be comprised of air. In some cases, coolant flow may have a rate within a range a specified range. A non-limiting exemplary coolant flow range may be about 0.2 CFM and about 200 CFM. In some cases, rate of coolant flow may be considered as a volumetric flow rate. Alternatively or additionally, rate of coolant flow may be considered as a velocity or flux. In some embodiments, coolant source 224 may be further configured to transfer heat between a heat source, such as without limitation ambient air or chemical energy, such as by way of combustion, and coolant, for example coolant flow. In some cases, coolant source 224 may heat coolant, for example above ambient air temperature, and/or cool coolant, for example below an ambient air temperature. In some cases, coolant source 224 may be powered by electricity, such as by way of one or more electric motors. Alternatively or additionally, coolant source 224 may be powered by a combustion engine, for example a gasoline powered internal combustion engine. In some cases, coolant flow may be configured, such that heat transfer is facilitated between coolant flow and at least a battery, by any methods known and/or described in this disclosure. In some cases, at least a battery may include a plurality of pouch cells. In some cases, heat is transferred between coolant flow and one or more components of at least a pouch cell, including without limitation electrical tabs, pouch and the like. In some cases, coolant flow may be configured to facilitate heat transfer between the coolant flow and at least a conductor of electric vehicle, including without limitation electrical busses within at least a battery.

Still referring to FIG. 2B, in some embodiments, coolant source 236 may occur synchronously and/or asynchronously with charging. For example, in some case, coolant source 236 may be configured to provide a flow of coolant prior to charging a battery of an electric vehicle. In some embodiments, cooling channel 220 may facilitate fluidic and/or thermal communication with coolant source 236 and at least a battery when connector 200 is connected to port 212. Alternatively and/or additionally, cooling channel 220 may facilitate fluidic and/or thermal communication with coolant source 236 and a cabin and/or cargo-space of aircraft when connector 200 is connected to port 212. In some cases, a plurality of cooling channels 228, coolant sources 232, and/or connectors may be used to connect to multiple components of an electric vehicle. In some cases, coolant source 236 may provide conditioned air in order to control an environmental temperature within an electric vehicle, such as an aircraft, for example without limitation for cargo, passengers, and/or crew. In some cases, coolant source 236 may pre-condition at least a vehicle battery. As used in this disclosure, "pre-conditioning" is an act of affecting a characteristic of a battery, for example battery temperature, pressure, humidity, swell, and the like, substantially prior to charging. For example and without limitation, coolant source 236 may be configured to pre-condition at least a battery prior to charging, by providing a coolant flow to the at least a battery and raising and/or lowering temperature of the at least a battery. As a further non-limiting example, pre-conditioning may occur for a predetermined time prior to charging (e.g., 2 min, 20 min, 2 hour, 4 hours, and the like). Alternatively or additionally, pre-conditioning may be feedback controlled, by way of at least a battery sensor, and occur until or for a predetermined time after a certain condition has been met, such as without limitation when at least a battery is within a desired temperature range. In some cases, coolant source 236 may be configured to pre-condition any space or component within a vehicle, such as an aircraft, including without limitation cargo space and cabin. In some cases, and without limitation, coolant source 236 may provide cooling to at least a battery after charging the at least a battery. In some cases, and without limitation, at least a machine-learning process may be used to determine and/or optimize parameters associated with cooling at least a battery. In some non-limiting cases, controller 240 may use at least a machine-learning process to optimize cooling time relative of current charging metrics, for example charging battery parameters and/or sensor signals. Coolant source 236 may include any computing device described in this disclosure. Coolant source 236 and controller 240 may utilize any machine-learning process described in this disclosure.

With continued reference to FIG. 2B, controller 240 may be configured to control one or more electrical charging current within conductor 208 and coolant flow within cooling channel 224. As used in this disclosure, a "controller" is a logic circuit, such as an application-specific integrated circuit (ASIC), FPGA, microcontroller, and/or computing device that is configured to control a subsystem. For example, controller 240 may be configured to control one or more of coolant source 236 and/or charging battery. In some embodiments controller may control coolant source 236 and/or charging battery according to a control signal. As used in this disclosure, "control signal" is any transmission from controller to a subsystem that may affect performance of subsystem. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal may include commands to operate one or more of coolant source 236 and/or charging battery. For example, in some cases, coolant source 236 may include a valve to control coolant flow and controller 240 may be configured to control the valve by way of control signal. In some cases, coolant source 236 may include a flow source (e.g., a pump, a fan, or the like) and controller 240 may be configured to control the flow source by way of control signal. In some cases, coolant source 236 may be configured to control a temperature of coolant and controller 240 may be configured to control a coolant temperature setpoint or range by way of control signal. In some cases, charging battery may include one or electrical components configured to control flow of an electric recharging current or switches, relays, direct current to direct current (DC-DC) converters, and the like. In some case, charging battery may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within charging battery or within communication with charging battery are configured to affect electrical recharging current according to control signal from controller 240, such that the controller 240 may control at least a parameter of the electrical charging current. For example, in some cases, controller 240 may control one or more of current (Amps), potential (Volts), and/or power (Watts) of electrical charging current by way of control signal. In some cases, controller 240 may be configured to selectively engage electrical charging current, for example ON or OFF by way of control signal.

With continued reference to FIG. 2B, connector 200 may be configured such that one or more conductors 208 and cooling channel 220 make a connection with mating component 228 of electric vehicle port when the connector 200 is mated with electric vehicle port. As used in this disclosure, a "mating component" is a component that is configured to mate with at least another component, for example in a certain (i.e. mated) configuration.

With continued reference to FIG. 2B, a conductor 208 may include a proximity signal conductor. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric vehicle port and/or test port. In some cases, a proximity signal may include an analog signal, a digital signal, an electrical signal, an optical signal, a fluidic signal, or the like. In some cases, a proximity signal conductor may be configured to conduct a proximity signal indicative of attachment between connector 200 and a port, for example electric vehicle port.

Still referring to FIG. 2B, in some cases, connector 200 may additionally include a proximity sensor. For example, and without limitation, sensor 244 may include a proximity sensor. Proximity sensor may be electrically communicative with a proximity signal conductor. Proximity sensor may be configured to generate a proximity signal as a function of connection between connector 200 and a port, for example port of electric aircraft. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

Still referring to FIG. 2B, in some embodiments, connector 200 may additionally include an isolation monitor conductor configured to conduct an isolation monitoring signal. In some cases, power systems for example charging battery or electric aircraft batteries must remain electrically isolated from communication, control, and/or sensor signals. As used in this disclosure, "isolation" is a state where substantially no communication of a certain type is possible between to components, for example electrical isolation refers to elements which are not in electrical communication. Often signal carrying conductors and components (e.g., sensors) may need to be in relatively close proximity with power systems and/or power carrying conductors. For instance, battery sensors which sense characteristics of batteries, for example batteries within an electric vehicle, are often by virtue of their function placed in close proximity with a battery. A battery sensor that measures battery charge and communicates a signal associated with battery charge back to controller 240 is at risk of becoming un-isolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power (e.g., battery and/or charging battery) may be required for housing of connector 200 and a ground. Isolation monitoring signal may, in some cases, communication information about isolation between an electrical power and ground, for example along a flow path that includes connector 200.

Still referring to FIG. 2B, in some embodiments, connector 200 may additionally include a cooling channel 220 being located proximal or otherwise in thermal communication with one or more conductors 220, for example direct current conductor and/or alternating current conductor. In some cases, heat generated within one or more conductors 208 may be transferred into coolant within cooling channel 220. In some cases, cooling channel 220 may be arranged substantially coaxial with one or more conductors 220, such that coolant flows substantially parallel with an axis of the one or more conductors 220. Alternatively or additionally, in some cases, cooling channel 220 may be arranged in cross flow with one or more conductors 220. In some cases, connector 200 may include a heat exchanged configured to extract heat from one or more conductors 220, for example at a location of high current and/or high impedance (e.g., resistance) within conductor. In some cases, generated heat within a conductor 208 may be proportional to current within conductor squared. Heating within a conductor 208 may be understood according to Joule heating, also referred to in this disclosure as resistive, resistance, or Ohmic heating. Joule-Lenz law states that power of heat generated by a conductor 208 is proportional to a product of conductor 208 resistance and a square of current within the conductor 208, see below.

$$P \propto I^2 R$$

where P is power of heat generated, for example in Watts, I is electric current within conductor 208, for example in Amps, and R is resistance of conductor 208, for example in Ohms. In some cases, coolant flow may be configured to provide a cooling load that is sufficient to cool at least a conductor 208 and one or more electric vehicle batteries during charging.

Still referring to FIGS. 2A AND 2B, in some embodiments, one or more of at least a direct current conductor and at least an alternating current conductor may be further configured to conduct a communication signal and/or control signal by way of power line communication. In some cases, controller 240 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a power conductor 208. Different types of power-line communications use different frequency bands. In some case, alternating current may have a frequency of about 50 or about 60 Hz. In some cases, power conductor 208 may be shielded in order to prevent emissions of power line communication modulation frequencies. Alternatively or additionally, power line communication modulation frequency may be within a range unregulated by radio regulators, for example below about 500 KHz.

Still referring to FIG. 2B, in some embodiments, housing of connector 200 may be configured to mate with a test port. For example, test port may be identical to electric aircraft port. As used in this disclosure, a "test port" is port located outside of an electric vehicle that mates with connector. In some cases, test port may close a circuit with one or more conductors or flow paths within connector and thereby allow for said one more conductors or flow paths to be tested, for example for continuity, impedance, resistance, and the like. In some cases, test port may be configured to test functionality of one or more of the at least a direct current conductor, the at least an alternating current conductor, the at least a control signal conductor, the at least a ground conductor, the at least a cooling channel, and the at least a proximity conductor. Test port may facilitate one or more signals, for example feedback signals, to be communicated with controller 240 as a function of connector 200 being attached with test port. In some cases, test port may allow for verification that performance of connector 200 is within specified limits. As used in this disclosure, "verification" is a process of ensuring that which is being "verified" complies with certain constraints, for example without limitation system requirements, regulations, and the like. In some cases, verification may include comparing a product, such as without limitation charging or cooling performance metrics, against one or more acceptance criteria. For example, in some cases, charging or cooling performance metrics, may be required to function according to prescribed constraints or specification. Ensuring that charging or cooling performance metrics are in compliance with acceptance criteria may, in some cases, constitute verification. In some cases, verification may include ensuring that data (e.g., performance metric data) is complete, for example that all required data types, are present, readable, uncorrupted, and/or otherwise useful for controller 240. In some cases, some or all verification processes may be performed by controller 240. In some cases, at least a machine-learning process, for example a machine-learning model, may be used to verify. Controller 240 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

Figure 3:
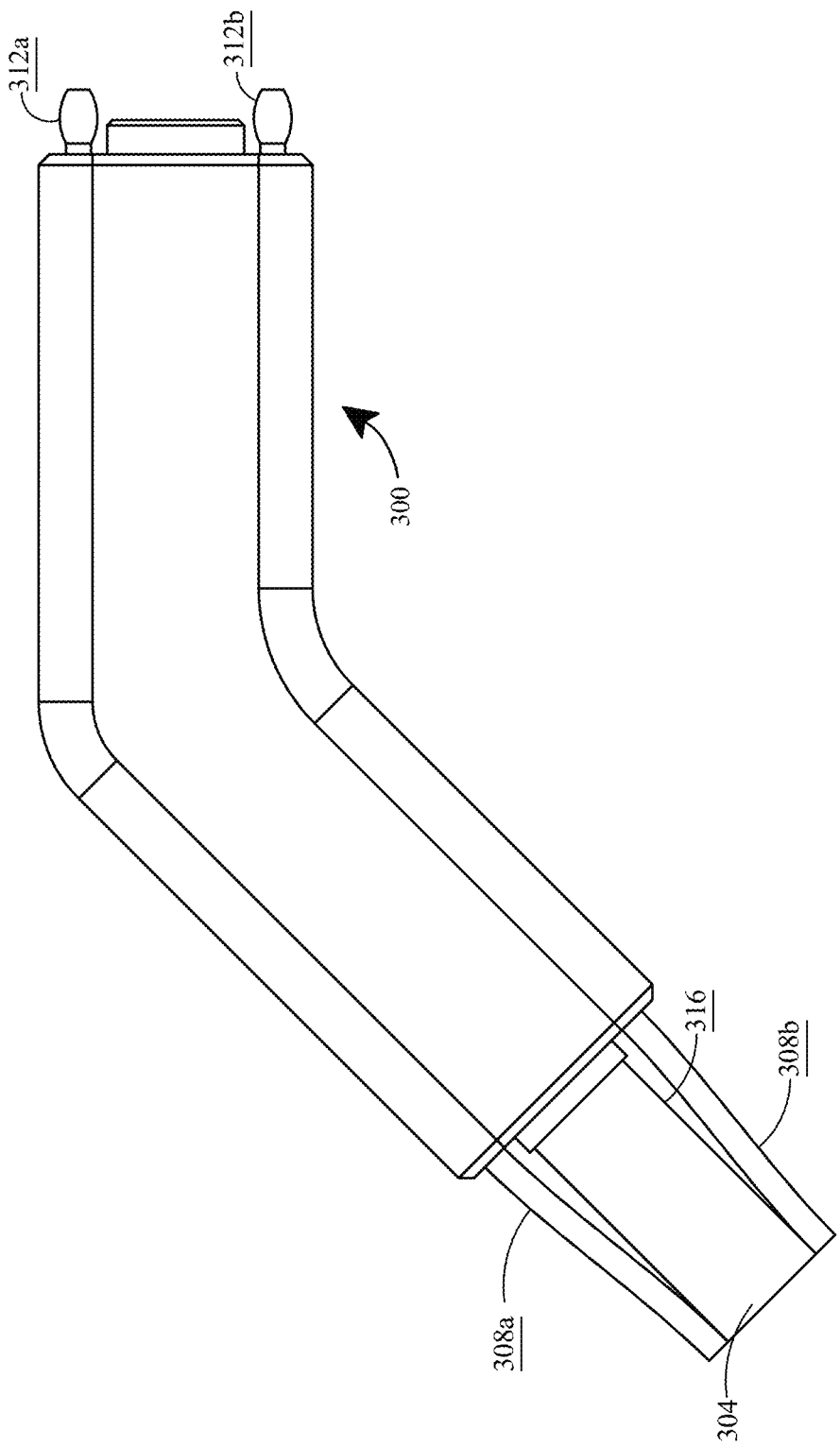
FIG. 3 illustrates an exemplary schematic of an exemplary connector for charging an electric vehicle in accordance with one or more embodiments of the present disclosure.

Referring now to FIG. 3, an exemplary connector 300 is schematically illustrated. Connector 300 is illustrated with a tether 304. Tether 304 may include one or more conductors and/or cooling channels. Tether 304 may include a conduit, for instance a jacket, enshrouding one or more conductors and/or cooling channels. In some cases, conduit may be flexible, electrically insulating, and/or fluidically sealed. As shown in FIG. 3, exemplary connector 300 is shown with a first power conductor and a second power conductor. As used in this disclosure, a "power conductor" is a conductor configured to conduct an electrical charging current, for example a direct current and/or an alternating current. In some cases, a conductor may include a cable and a contact. A cable may include any electrically conductive material including without limitation copper and/or copper alloys. As used in this disclosure, a "contact" is an electrically conductive component that is configured to make physical contact with a mating electrically conductive component, thereby facilitating electrical communication between the contact and the mating component. In some cases, a contact may be configured to provide electrical communication with a mating component within a port. In some cases, a contact may contain copper and/or copper-alloy. In some cases, contact may include a coating. A contact coating may include without limitation hard gold, hard gold flashed palladium-nickel (e.g., 80/30), tin, silver, diamond-like carbon, and the like.

With continued reference to FIG. 3, a first conductor may include a first cable 308a and a first contact 313a in electrical communication with the first cable. Likewise, a second conductor may include a second cable 308b and a second contact 312b in electrical communication with the second cable. In some cases, connector 300 may also include a cooling channel 316. In some cases, connector 300 may include a plurality of cooling channels for example a coolant supply and a coolant return. Alternatively, in some cases, connector 300 may include one cooling channel 316, for example without limitation when coolant supplied is a gas or is not returned to coolant source. In some cases, cooling channel 316 may be located in thermal communication with a cable 308a-b, thereby allowing coolant to cool the cable 308a-b. In some cases, cooling channel 316 may be located within thermal communication with a contact 312a-b, thereby allowing coolant to cool the contacts 312a-b.

Referring now to FIG. 4, an exemplary cross-sectional view of an exemplary connector 400 is illustrated. Connector 400 is illustrated with a tether 404. Tether 404 may include one or more conductors and/or cooling channels. Connector 400 is shown with a first power conductor and a second power conductor. A first conductor may include a first cable 408a and a first contact 412a in electrical communication with the first cable. Likewise, a second conductor may include a second cable 408b and a second contact 412b in electrical communication with the second cable. Connector 400 may also include a cooling channel 416.

As shown in FIG. 4, in some cases, cooling channel 416 may be configured to mate with a port. For example, cooling channel 416 may include a fitting within connector 400. In some cases, fitting may include one or more seals 420. Seals may include any seal described in this disclosure and may be configured to seal a joint between cooling channel 416 and a mating component (e.g., fitting and/or additionally cooling channel) within port, when connector is attached to the port. As used in this disclosure, a "seal" is a component that is substantially impermeable to a substance (e.g., coolant, air, and/or water) and is designed and/or configured to prevent flow of that substance at a certain location, e.g., joint. Seal may be configured to seal coolant. In some cases, seal may include at least one of a gasket, an O-ring, a mechanical fit (e.g., press fit or interference fit), and the like. In some cases, seal may include an elastomeric material, for example without limitation silicone, buna-N, fluoroelastomer, fluorosilicone, polytetrafluoroethylene, polyethylene, polyurethane, rubber, ethylene propylene diene monomer, and the like. In some cases, seal may include a compliant element, such as without limitation a spring or elastomeric material, to ensure positive contact of seal with a sealing face. In some cases, seal may include a piston seal and/or a face seal. As used in this disclosure, a "joint" is a transition region between two components. For example in some cases, a cooling channel may have a joint located between connector and electric vehicle port.

With continued reference to FIG. 4, in some embodiments, cooling channel 416 may include a valve 424. Valve 424 may include any type of valve, for example a mechanical valve, an electrical valve, a check valve, or the like. In some cases, valve 424 may include quick disconnect. In some cases, valve 424 may include a normally-closed vale, for example a mushroom-poppet style valve, as shown in FIG. 4. Additional non-limiting examples of normally-closed valves include solenoid valves, a spring-loaded valve, and the like. In some cases, a valve may include one or more of a ball valve, a butterfly valve, a body valve, a bonnet valve, a port valve, an actuator valve, a disc valve, a seat valve, a stem valve, a gasket valve, a trim valve, or the like. In some cases, valve 424 may be configured to open when connector is attached to port and/or when cooling channel 416, in particular, is mated with a mating component within port. In some cases, valve 424 may be automatically opened/closed, for example by a controller 140. As described in more detail below, in some exemplary embodiments, mating of certain components within connector and port occur in prescribed sequence. For example, in some cases, cooling channel 416 may first be mated and sealed to its mating component within a port, before a valve 424 is opened and/or one or more conductors 412a-b are mated to their respective mating components within the port. In some cases, valve 424 may be configured not to open until after connection of one or more conductors 412a-b. In some embodiments, connector 400 may provide coolant by way of cooling channel 416 to port.

Alternatively or additionally, in some embodiments, connector may include a cooling channel which is substantially closed and configured to cool one or more conductors.

Figure 5:
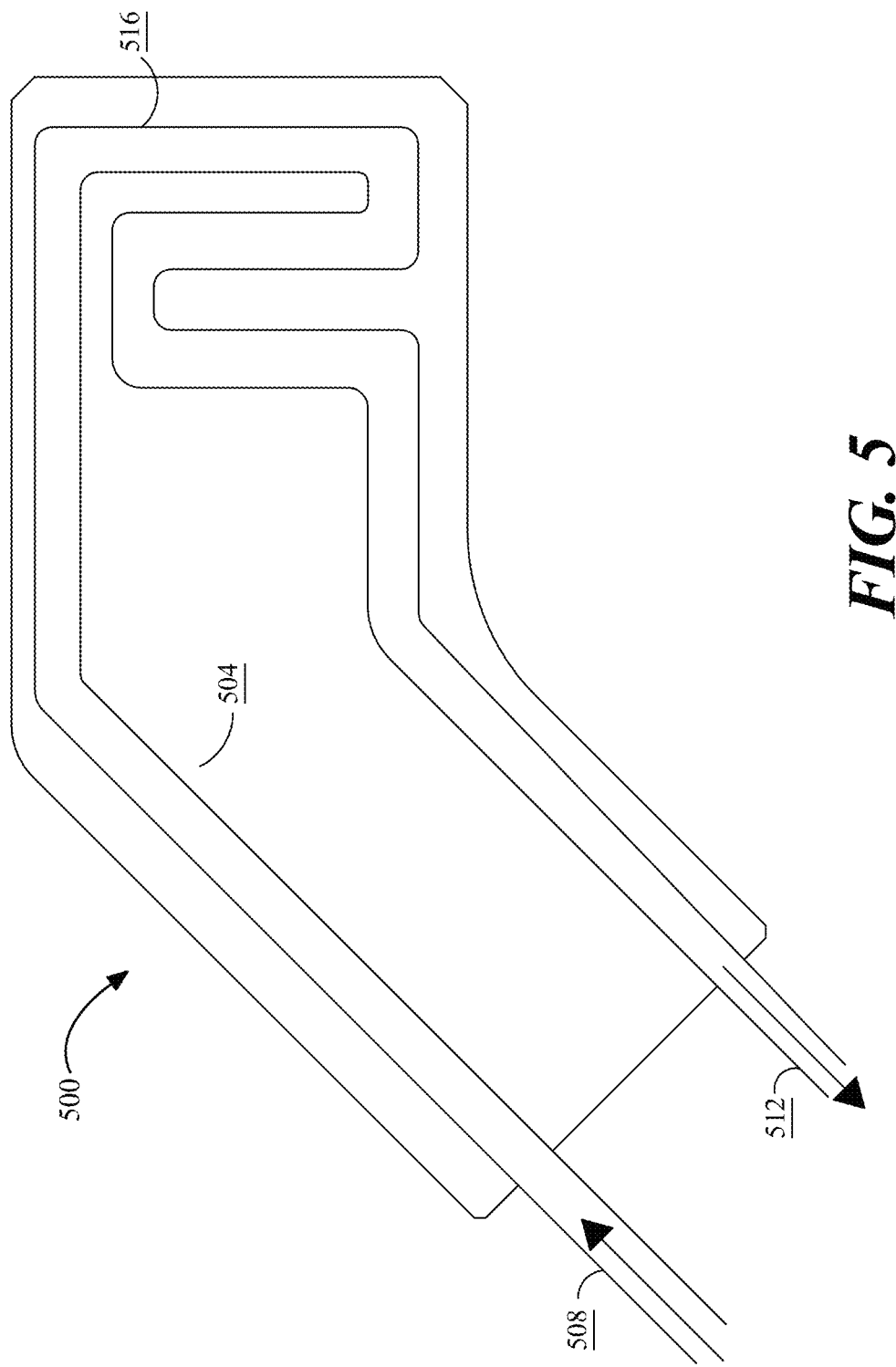
FIG. 5 illustrates an exemplary cooling channel within an exemplary connector in accordance with one or more embodiments of the present disclosure.

Referring now to FIG. 5, an exemplary connector 500 is shown. In some embodiments, connector 500 may include a cooling channel 505. In some cases, cooling channel 505 may be substantially sealed within connecter 500. For example, in some cases, a coolant flow 505 path may not be mated to a mating component, such as a fluidic fitting or flow path, when connecter 500 is attached to a port. In some cases, a cooling channel 505 within connector 500 may include a coolant supply 508, a coolant return 512, and/or a heat exchanger 516. In some cases, coolant supply 508 is configured to contain and direct a flow of coolant substantially toward and within connector 500; coolant return is configured to contain and direct the flow of coolant substantially away from connector 500; and heat exchanger 516 is configured to transfer heat from at least a portion (or component of connector) into the flow of coolant. In some cases, heat exchanger 516 may be located proximal and/or within thermal conductivity of at least one conductor, cable, and/or contact, for example a power conductor. As described above, connector 500 may include one or more temperature sensors configured to detect a temperature and transmit a signal representative of that temperature, for example to a controller. In some cases, at least a temperature sensor may be located within thermal communication of one or more of a conductor, a cable, and/or a contact and controller may control one or more aspects of a flow of coolant and/or electrical charging current as a function of the detected temperature. In some cases, connector 500 may include a plurality of cooling channels, for example a first cooling channel 505 that is substantially sealed and a second cooling channel that is configured to be in fluidic communication with a mating component when connector 500 is attached to a port. In some cases, a first cooling channel 505 may be in thermal communication, for example by way of a heat exchanger, with a second cooling channel 316, such that coolant of the second cooling channel may be cooled by coolant of the first cooling channel 505.

Figure 6:
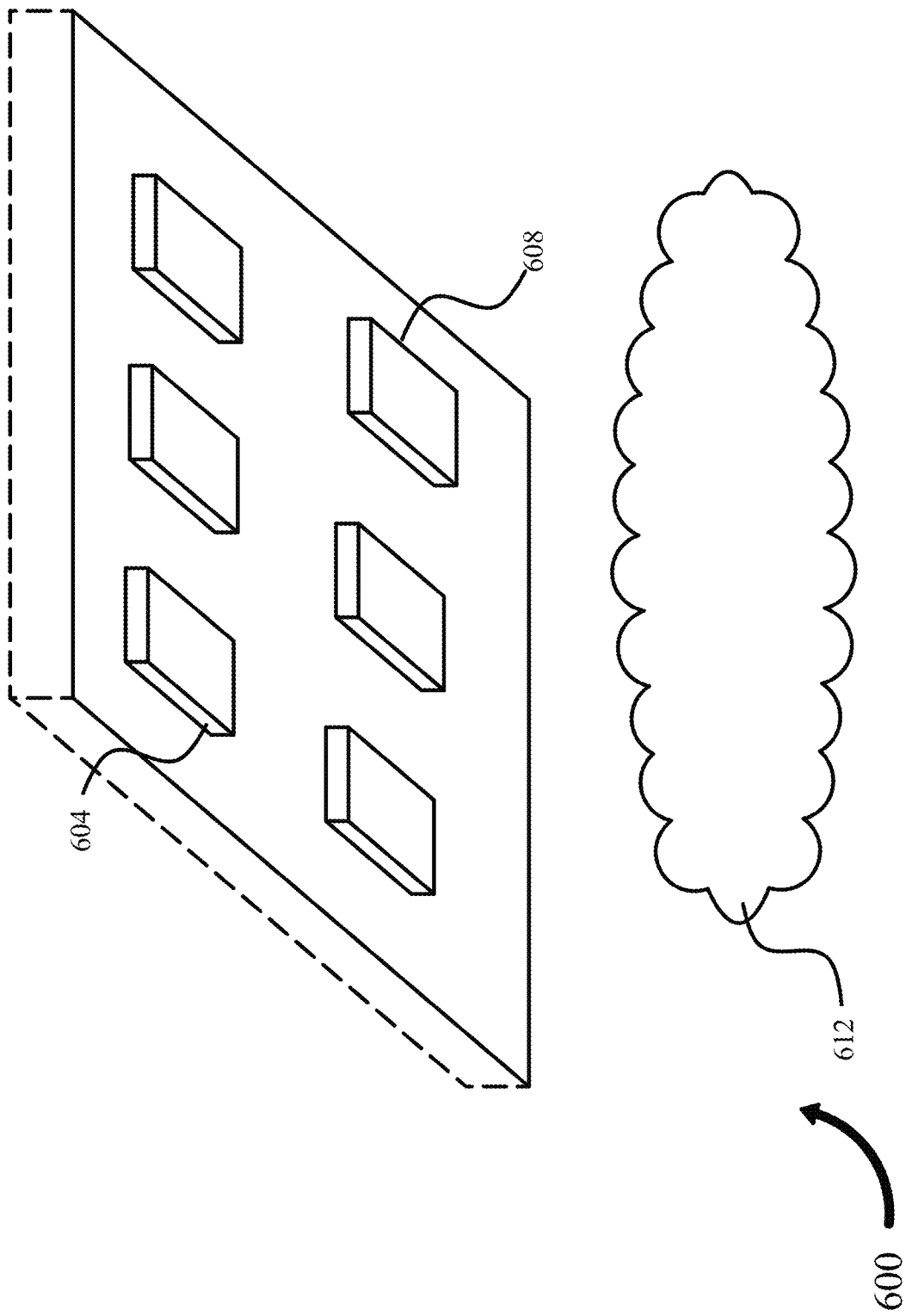
FIG. 6 is a block diagram illustrating an exemplary sensor suite in accordance with one or more embodiments of the present disclosure.

Referring now to FIG. 6, an embodiment of sensor suite 600 is presented. The herein disclosed system and method may comprise a plurality of sensors in the form of individual sensors or a sensor suite working in tandem or individually. In some cases, sensor suite 600 may communicate by way of at least a conductor, such as within limitation a control signal conductor. Alternatively and/or additionally, in some cases, sensor suite 600 may be communicative by at least a network, for example any network described in this disclosure including wireless (Wi-Fi), controller area network (CAN), the Internet, and the like. A sensor suite may include a plurality of independent sensors, as described herein, where any number of the described sensors may be used to detect any number of physical or electrical quantities associated with a vehicle battery or an electrical energy storage system, such as without limitation charging battery. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of controller and/or user to detect phenomenon is maintained.

With continued reference to FIG. 6, sensor suite 600 may include a humidity sensor 604. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Humidity sensor 604 may be psychrometer. Humidity sensor 604 may be a hygrometer. Humidity sensor 604 may be configured to act as or include a humidistat. A "humidistat", for the purposes of this disclosure, is a humidity-triggered switch, often used to control another electronic device. Humidity sensor 604 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 6, sensor suite 600 may include multimeter 608. Multimeter 608 may be configured to measure voltage across a component, electrical current through a component, and resistance of a component. Multimeter 608 may include separate sensors to measure each of the previously disclosed electrical characteristics such as voltmeter, ammeter, and ohmmeter, respectively.

Alternatively or additionally, and with continued reference to FIG. 6, sensor suite 600 may include a sensor or plurality thereof that may detect voltage and direct charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 600 and/or a control circuit incorporated therein and/or communicatively connected thereto may be configured to adjust charge to one or more battery cells as a function of a charge level and/or a detected parameter. For instance, and without limitation, sensor suite 600 may be configured to determine that a charge level of a battery cell is high based on a detected voltage level of that battery cell or portion of the battery pack. Sensor suite 600 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 600 may include digital sensors, analog sensors, or a combination thereof. Sensor suite 600 may include digital-to-analog converters (DAC), analog-to-digital converters (ADC, A/D, A-to-D), a combination thereof, or other signal conditioning components used in transmission of a battery sensor signal to a destination over wireless or wired connection.

With continued reference to FIG. 6, sensor suite 600 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 600, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 6, sensor suite 600 may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure 612 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 600, may be configured to detect combustible, flammable, toxic, oxygen depleted, a combination thereof, or another type of gas alone or in combination. The gas sensor that may be present in sensor suite 600 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 600 may include sensors that are configured to detect non-gaseous byproducts of catastrophic cell failure 612 including, in non-limiting examples, liquid chemical leaks including aqueous alkaline solution, ionomer, molten phosphoric acid, liquid electrolytes with redox shuttle and ionomer, and salt water, among others. Sensor suite 600 may include sensors that are configured to detect non-gaseous byproducts of catastrophic cell failure 612 including, in non-limiting examples, electrical anomalies as detected by any of the previous disclosed sensors or components.

With continued reference to FIG. 6, sensor suite 600 may be configured to detect events where voltage nears an upper voltage threshold or lower voltage threshold. The upper voltage threshold may be stored in data storage system for comparison with an instant measurement taken by any combination of sensors present within sensor suite 600. The upper voltage threshold may be calculated and calibrated based on factors relating to battery cell health, maintenance history, location within battery pack, designed application, and type, among others. Sensor suite 600 may measure voltage at an instant, over a period of time, or periodically. Sensor suite 600 may be configured to operate at any of these detection modes, switch between modes, or simultaneous measure in more than one mode. Controller may detect through sensor suite 600 events where voltage nears the lower voltage threshold. The lower voltage threshold may indicate power loss to or from an individual battery cell or portion of the battery pack. Controller 140 may detect through sensor suite 600 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

With continued reference to FIG. 6, in some cases, sensor suite 600 may include a swell sensor configured to sense swell, pressure, or strain of at least a battery cell. In some cases, battery cell swell, pressure, and/or strain may be indicative of an amount of gases and/or gas expansion within a battery cell. Battery swell sensor may include one or more of a pressure sensor, a load cell, and a strain gauge. In some cases, battery swell sensor may output a battery swell signal that is analog and requires signal processing techniques. For example, in some cases, wherein battery swell sensor includes at least a strain gauge, battery swell signal may be processed and digitized by one or more of a Wheatstone bridge, an amplifier, a filter, and an analog to digital converter. In some cases, battery sensor signal may include battery swell signal.

Figure 7:
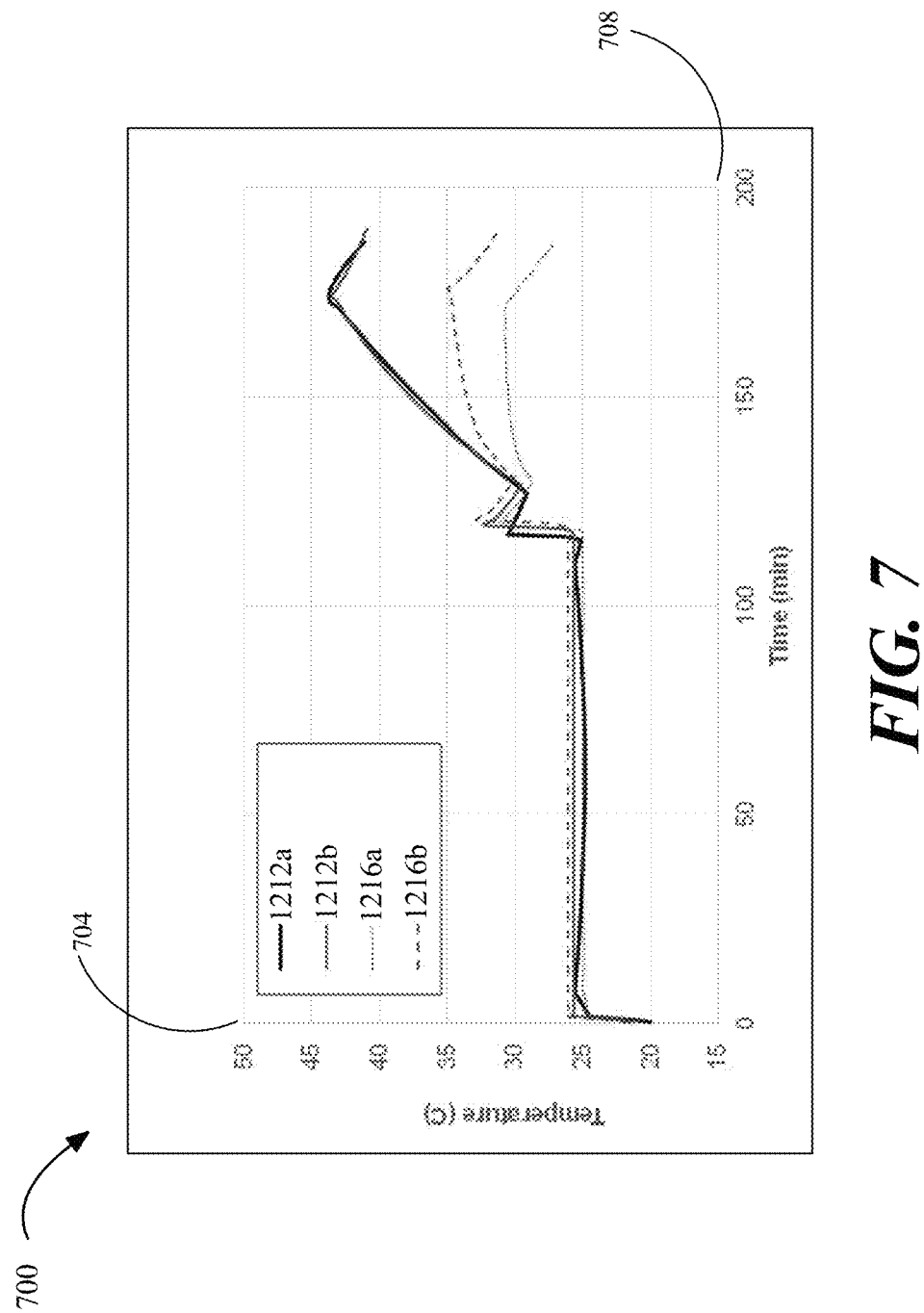
FIG. 7 is a graph that depicts exemplary battery temperature during recharge under a number of exemplary conditions in accordance with one or more embodiments of the present disclosure.

Referring now to FIG. 7, a graph 700 is depicted that illustrated exemplary vehicle battery temperature during exemplary recharging processes. Graph 700 illustrates battery temperature along a vertical axis 704, in degrees Celsius. Graph 700 illustrates time along a horizontal axis 708, in minutes. Graph 700 illustrates battery temperature during recharge for a vehicle battery in four different tests. During all four recharging processes ambient air temperature was approximately 20° C. and recharging was performed for about 1 hour (from time equals approximately 70 min to time equals approximately 180 min). Prior to recharging in each case, vehicle battery was used to take-off, fly approximately 200 nm, land, and cool (from time equals zero to time equals approximately 70 min). Recharge during each case was brought vehicle battery from approximately a 25% state of charge to approximately a 98% state of charge. A first and second baseline recharge 712*a-b* are illustrated on graph in by way of solid lines. It can be seen from graph 700, that first baseline 712*a* and second baseline 712*b* overlap very closely with one another. Both first and second baseline 712*a-b* were performed without cooling. Graph 700 illustrates two recharging conditions that included active cooling 717*a-b* by way of dashed lines. During active cooling, for the tests depicted in graph 700, coolant was air having a temperature approximately equal to that of ambient. First active cooling 717*a*, indicated on graph 700 by way of smaller dashed line, was performed with coolant flow of approximately 1 standard cubic foot per minute (SCFM). Second active cooling 717*b*, indicated on graph 700 by way of larger dashed line, was performed with coolant flow of approximately 0.5 standard cubic feet per minute (SCFM).

Figure 8:
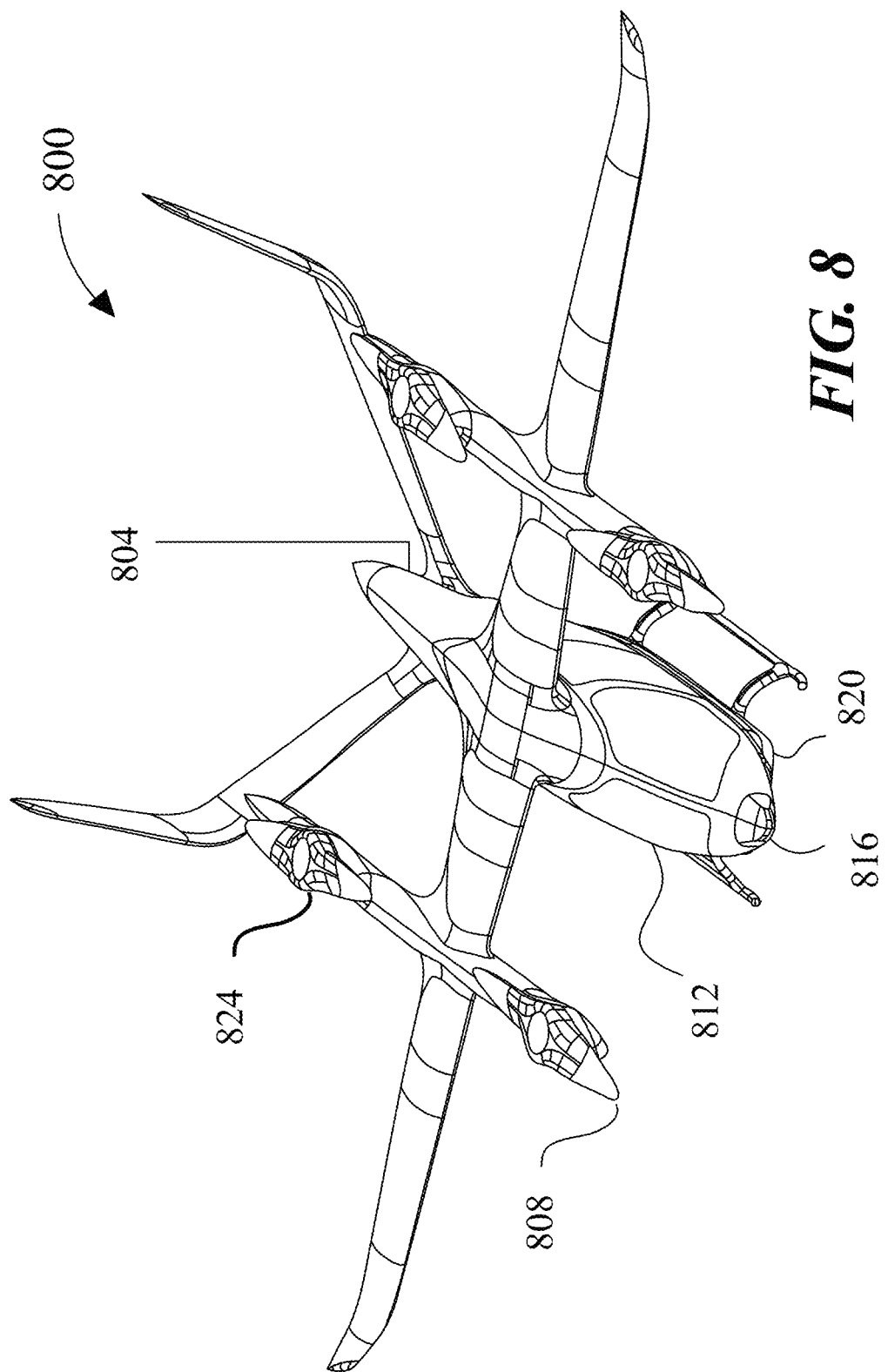
FIG. 8 is a schematic of an exemplary electric aircraft in accordance with one or more embodiments of the present disclosure.

Referring now to FIG. 8, an exemplary embodiment of an aircraft 800 is illustrated. Aircraft 800 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 8, aircraft 800 may include a fuselage 804. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 804 may comprise structural elements that physically support the shape and structure of an aircraft. Structural elements may take a plurality of forms, alone or in combination with other types. Structural elements may vary depending on the construction type of aircraft and specifically, the fuselage. Fuselage 804 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 8, aircraft 800 may include a plurality of actuators 808. Actuator 808 may include any motor and/or propulsor. In an embodiment, actuator 808 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 8, a plurality of actuators 808 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 808 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 808 may include a rudder, which may include, without limitation, a segmented rudder that produces a torque about a vertical axis. Additionally or alternatively, plurality of actuators 808 may include other flight control surfaces such as propulsors, rotating flight controls, or any other structural features which can adjust movement of aircraft 800. Plurality of actuators 808 may include one or more rotors, turbines, ducted fans, paddle wheels, and/or other components configured to propel a vehicle through a fluid medium including, but not limited to air.

Still referring to FIG. 8, plurality of actuators 808 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 8, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1. ° outward.

Still referring to FIG. 8, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 8, plurality of actuators 808 may include power sources, control links to one or more elements, fuses, and/or mechanical couplings used to drive and/or control any other flight component. Plurality of actuators 808 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 8, plurality of actuators 808 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 8, an energy source may be used to provide a steady supply of electrical power to a load over a flight by an electric aircraft 800. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 8, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 8, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 8, another exemplary actuator may include landing gear. Landing gear may be used for take-off and/or landing/Landing gear may be used to contact ground while aircraft 800 is not in flight. Exemplary landing gear is disclosed in detail in U.S. Patent Application Ser. No. 17/196,719 entitled "SYSTEM FOR ROLLING LANDING GEAR" by R. Griffin et al., which is incorporated in its entirety herein by reference.

Still referring to FIG. 8, aircraft 800 may include a pilot control 812, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 808. For example and without limitation, collective control may alter and/or adjust the pitch angle of all of the main rotor blades collectively. For example, and without limitation pilot control 812 may include a yoke control. As used in this disclosure a "yoke control" is a mechanical control of an aircraft to control the pitch and/or roll. For example and without limitation, yoke control may alter and/or adjust the roll angle of aircraft 800 as a function of controlling and/or maneuvering ailerons. In an embodiment, pilot control 812 may include one or more footbrakes, control sticks, pedals, throttle levels, and the like thereof. In another embodiment, and without limitation, pilot control 812 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 800 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 800 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 8, pilot control 812 may be configured to modify a variable pitch angle. For example, and without limitation, pilot control 812 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 812 may modify the variable pitch angle from a first angle of 2.81° to a second angle of 3.82°. Additionally or alternatively, pilot control 812 may be configured to translate a pilot desired torque for flight component 808. For example, and without limitation, pilot control 812 may translate that a pilot's desired torque for a propeller be 160 lb. ft. of torque. As a further non-limiting example, pilot control 812 may introduce a pilot's desired torque for a propulsor to be 290 lb. ft. of torque. Additional disclosure related to pilot control 812 may be found in U.S. patent application Ser. Nos. 17/001, 845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 8, aircraft 800 may include a loading system. A loading system may include a system configured to load an aircraft of either cargo or personnel. For instance, some exemplary loading systems may include a swing nose, which is configured to swing the nose of aircraft 800 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 8, aircraft 800 may include a sensor 816. Sensor 816 may include any sensor or noise monitoring circuit described in this disclosure. Sensor 816 may be configured to sense a characteristic of pilot control 812. Sensor may be a device, module, and/or subsystem, utilizing any hardware, software, and/or any combination thereof to sense a characteristic and/or changes thereof, in an instant environment, for instance without limitation a pilot control 812, which the sensor is proximal to or otherwise in a sensed communication with, and transmit information associated with the characteristic, for instance without limitation digitized data. Sensor 816 may be mechanically and/or communicatively coupled to aircraft 800, including, for instance, to at least a pilot control 812. Sensor 816 may be configured to sense a characteristic associated with at least a pilot control 812 and/or controller 140. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 816 may include at least a geospatial sensor. Sensor 816 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 800 for both critical and non-critical functions. Sensor may be incorporated into vehicle or aircraft or be remote.

Still referring to FIG. 8, in some embodiments, sensor 816 may be configured to sense a characteristic associated with any pilot control described in this disclosure. Non-limiting examples of a sensor 816 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 816 may sense a characteristic as an analog measurement, for instance, yielding a continuously variable electrical potential indicative of the sensed characteristic. In these cases, sensor 816 may additionally comprise an analog to digital converter (ADC) as well as any additionally circuitry, such as without limitation a Whetstone bridge, an amplifier, a filter, and the like. For instance, in some cases, sensor 816 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 800, for instance without limitation a computing system, a pilot display, and a memory component. Alternatively or additionally, sensor 816 may sense a characteristic of a pilot control 812 digitally. For instance in some embodiments, sensor 816 may sense a characteristic through a digital means or digitize a sensed signal natively. In some cases, for example, sensor 816 may include a rotational encoder and be configured to sense a rotational position of a pilot control; in this case, the rotational encoder digitally may sense rotational "clicks" by any known method, such as without limitation magnetically, optically, and the like.

Still referring to FIG. 8, electric aircraft 800 may include at least a motor 824, which may be mounted on a structural feature of the aircraft. Design of motor 824 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 824 may include two main holes in top and bottom of mounting area to access bearing cartridge. Further, a structural feature may include a component of electric aircraft 800. For example, and without limitation structural feature may be any portion of a vehicle incorporating motor 824, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 808. Persons skilled in the art, upon reviewing the entirety of this disclosure, will be aware of various materials, combinations of materials, and/or constructions techniques.

Still referring to FIG. 8, electric aircraft 800 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 8, a number of aerodynamic forces may act upon the electric aircraft 800 during flight. Forces acting on electric aircraft 800 during flight may include, without limitation, thrust, the forward force produced by the rotating element of the electric aircraft 800 and acts parallel to the longitudinal axis. Another force acting upon electric aircraft 800 may be, without limitation, drag, which may be defined as a rearward retarding force which is caused by disruption of airflow by any protruding surface of the electric aircraft 800 such as, without limitation, the wing, rotor, and fuselage. Drag may oppose thrust and acts rearward parallel to the relative wind. A further force acting upon electric aircraft 800 may include, without limitation, weight, which may include a combined load of the electric aircraft 800 itself, crew, baggage, and/or fuel. Weight may pull electric aircraft 800 downward due to the force of gravity. An additional force acting on electric aircraft 800 may include, without limitation, lift, which may act to oppose the downward force of weight and may be produced by the dynamic effect of air acting on the airfoil and/or downward thrust from the propulsor 808 of the electric aircraft. Lift generated by the airfoil may depend on speed of airflow, density of air, total area of an airfoil and/or segment thereof, and/or an angle of attack between air and the airfoil. For example, and without limitation, electric aircraft 800 are designed to be as lightweight as possible. Reducing the weight of the aircraft and designing to reduce the number of components is essential to optimize the weight. To save energy, it may be useful to reduce weight of components of electric aircraft 800, including without limitation propulsors and/or propulsion assemblies. In an embodiment, motor 824 may eliminate need for many external structural features that otherwise might be needed to join one component to another component. Motor 824 may also increase energy efficiency by enabling a lower physical propulsor profile, reducing drag and/or wind resistance. This may also increase durability by lessening the extent to which drag and/or wind resistance add to forces acting on electric aircraft 800 and/or propulsors.

Figure 9:
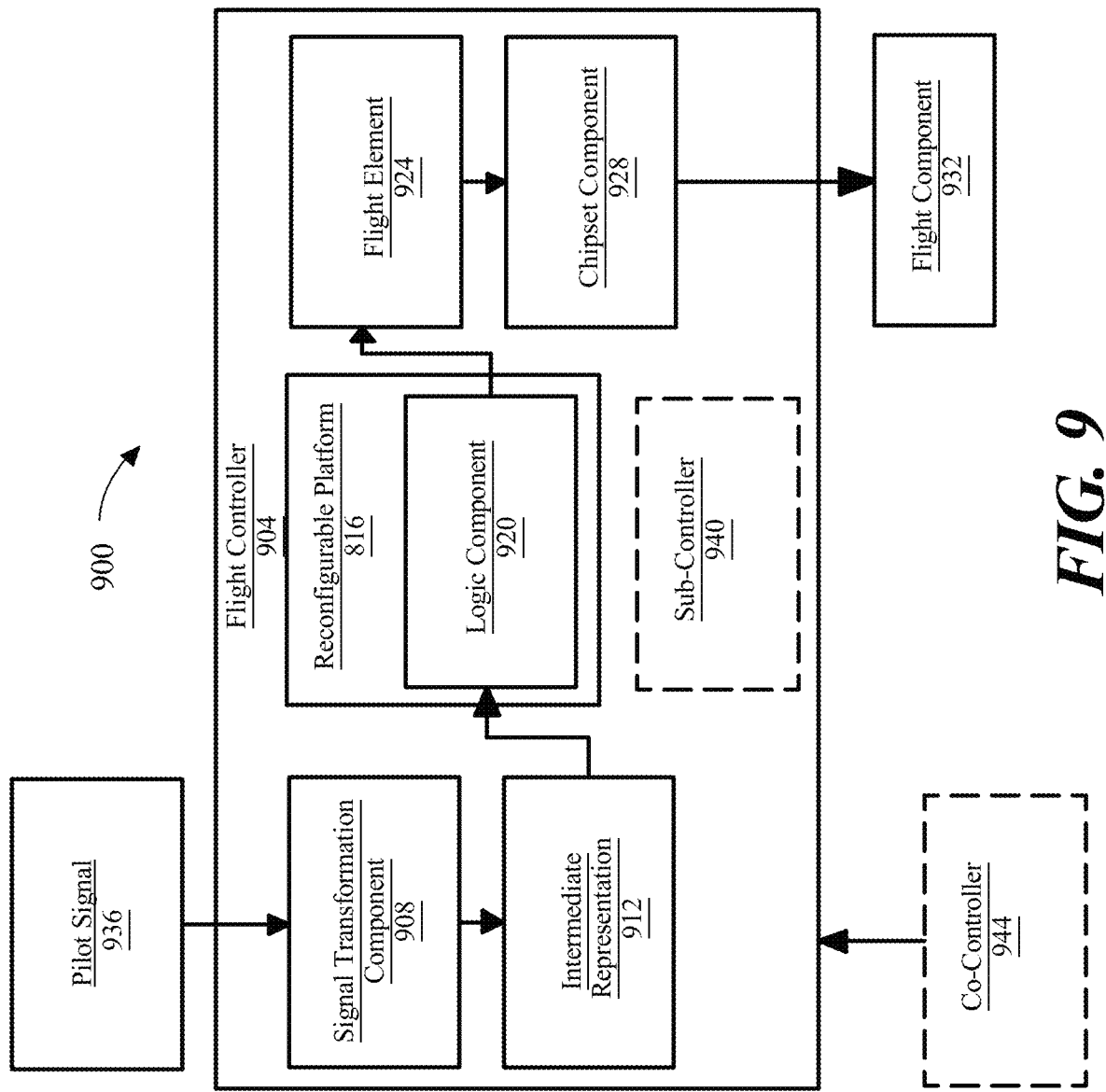
FIG. 9 is a block diagram depicting an exemplary flight controller in accordance with one or more embodiments of the present disclosure.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and without limitation, signal transformation component 908 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 932. As used in this disclosure a "flight component" is a portion of an aircraft that can be moved or adjusted to affect one or more flight elements. For example, flight component 1432 may include a component used to affect the aircrafts' roll and pitch which may comprise one or more ailerons. As a further example, flight component 932 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastienet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 932. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs x; that may receive numerical values from inputs to a neural network containing the node and/or from other nodes. Node may perform a weighted sum of inputs using weights w, that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above. In an embodiment, and without limitation, a neural network may receive semantic units as inputs and output vectors representing such semantic units according to weights w, that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
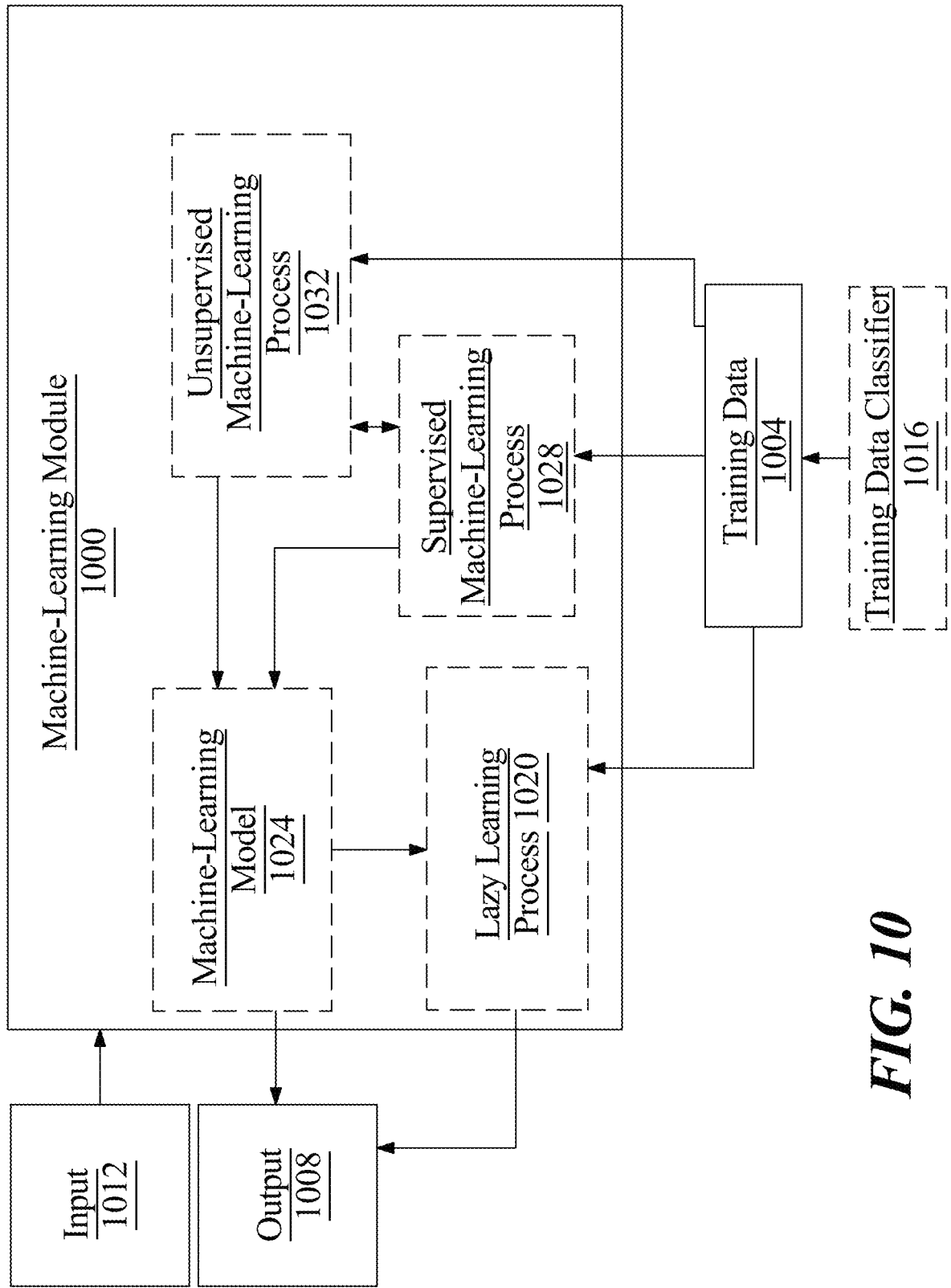
FIG. 10 is a block diagram of an exemplary machine-learning process in accordance with one or more embodiments of the present disclosure.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1616 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 11:
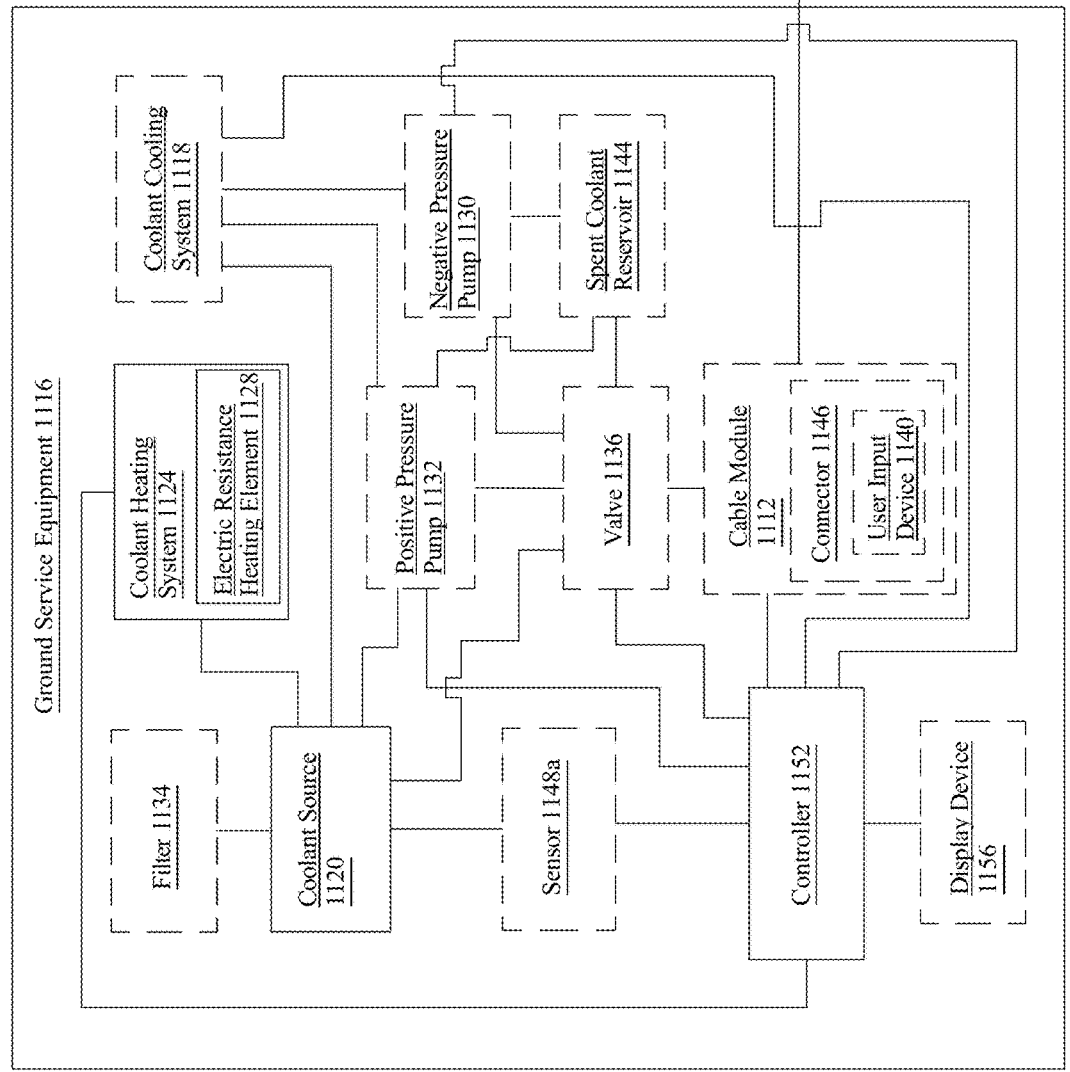
FIG. 11 is an illustration of an exemplary embodiment of a system 1100 for thermal management ground service equipment.

Referring now to FIG. 11, an exemplary embodiment of a system 1100 for thermal management ground service equipment is illustrated. In some embodiments, the system 1100 may be used to service any electric vehicles on the ground. For the purposes of this disclosure, an "electric vehicle" is any electrically power means of human transport. As a non-limiting example, the electric vehicle may include an electric aircraft, electric motorcycle, electric watercraft, electric car, and the like. For the purposes of this disclosure, an "electric aircraft" is an electrically powered aircraft. Electric aircraft 1104 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. In an embodiment, electric aircraft 1104 may include electric vertical takeoff and landing (eVTOL) aircraft. A "vertical take-off and landing aircraft," as used in this disclosure, is an aircraft that can hover, take off, and land vertically. In another embodiment, an electric aircraft 1104 may include an electric conventional takeoff and landing (eCTOL) aircraft. For the purposes of this disclosure, a "conventional take-off and landing aircraft" is an aircraft taking off and landing horizontally from a conventional length runway in the distance. In another embodiment, an electric aircraft 1104 may include an electric short takeoff and landing (eSTOL) aircraft. For the purposes of this disclosure, a "short takeoff and landing aircraft" is an aircraft that needs a shorter minimum horizontal distance to accelerate in order to ascend into the air than typical fixed wing types of aircrafts. In some embodiments, an electric aircraft 1104 may include a sensor. The sensor disclosed herein may be consistent with a sensor disclosed in this disclosure.

With continued reference to FIG. 11, in some embodiments, an electric aircraft 1104 may include a power source 1108. As used in this disclosure, a "power source" is an electrical device and/or component used to store and provide electrical energy to an electrical vehicle and its electrical subsystems. As a non-limiting example, the power source 1108 may include one or more battery cells, one or more battery modules, and/or one or more battery packs configured to provide electrical power to an electric aircraft 1104 and/or an aircraft electrical subsystem. For the purposes of this disclosure, a "battery pack" is a set of battery modules. For the purposes of this disclosure, a "battery module" is a set of battery cells. For the purposes of this disclosure, a "battery cell" is a single anode and cathode separated by electrolyte, wherein the cell produces voltage and current. In some embodiments, a power source 1108 may be one or more various types of batteries, such as a pouch cell battery, stack batteries, prismatic battery, lithium-ion cells, or the like. In some embodiments, the power source 1108 may include a battery, flywheel, rechargeable battery, flow battery, glass battery, lithium-ion battery, ultra-battery, and the like thereof. In some embodiments, the power source 1108 may include a thermal conduit, wherein the thermal conduit may provide a coolant flow in the power source 1108.

With continued reference to FIG. 11, in some embodiments, an electric aircraft 1104 may include a port 1110. For the purposes of this disclosure, a "port" is an interface that mates with a mating component and transmits and/or receives a signal on a computing device. "Mate," as used in this disclosure, is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but requires a specialized tool or key for removal. Mating may be achieved by way of one or more of plug and socket mates, pogo pin contact, crown spring mates, and the like. In some cases, mating may be keyed to ensure proper alignment of a mating component. In some cases, mate may be lockable. As used in this disclosure, a "mating component" is a component that mates with at least another component. As a non-limiting example, a mating component may include a cable module 1112. In some embodiments, a port 1110 may be configured to mate with a cable module 1112. The cable module 1112 disclosed herein is further described below. As a non-limiting example, a port 1110 may include a female component having a receptive form, receptive to a male component, a cable module 1112. Alternatively or additionally, a port 1110 may include a male component having a penetrative form that may include one or more plug pins, that may be protruding pins, that mates with a socket, a female component of a cable module 1112.

With continued reference to FIG. 11, in some embodiments, a system 1100 includes ground service equipment 1116. For the purposes of this disclosure, "ground service equipment," also called "GSE" is a service equipment that supports an operation of an electric vehicle whilst on the ground. The ground service equipment 1116 may support any electric vehicle disclosed herein. In some embodiments, the ground service equipment 1116 may be connected to the electric vehicle 104 during a support. As a non-limiting example, the ground service equipment 1116 may be connected to the electric aircraft 1104 using a cable module 1112, wherein the cable module is further described below. In some embodiments, ground service equipment 1116 is configured to manage temperature of a power source 1108 of an electric aircraft 1104. For the purposes of this disclosure, "temperature" is a measure of the heat energy of a system. Temperature may be measured in Fahrenheit (° F.), Celsius (° C.), Kelvin (° K), or another scale alone or in combination.

With continued reference to FIG. 1, in an embodiment, ground service equipment 1116 may be configured to manage temperature of the power source 1108 while charging an electric aircraft 1104. For the purposes of this disclosure, "charging" refers to a process of increasing energy stored within a power source. As a non-limiting example, the power source 1108 may include at least a battery and charging may include providing an electrical current to the at least a battery. In some embodiments, the ground service equipment 1116 may be configured to heat the power source 1108 while charging the electric aircraft 1104. For the purposes of this disclosure, "heating" refers to a process of increasing thermal energy of a system. For the purposes of this disclosure, "thermal energy" refers to the energy contained within a system that is responsible for its temperature. In some embodiments, the ground service equipment 1116 may be configured to cool the power source 1108 while charging the electric aircraft 1116. For the purposes of this disclosure, "cooling" refers to a process of removing thermal energy from a system. As a non-limiting example, the power source 1108 may get heated while charging the power source 1108, then the ground service equipment 1116 may be configured to cool the power source 1108 using a coolant. The coolant disclosed herein is further disclosed below.

With continued reference to FIG. 11, in another embodiment, ground service equipment 1116 may be configured to manage temperature of the power source 1108 while preconditioning the electric aircraft 1104. For the purposes of this disclosure, "preconditioning" is a set of operations to intensify one or more electrical subsystems of an electric aircraft to prepare it for an operation. Preconditioning may include a set of operations to modify a temperature of component of an electric aircraft 1104, wherein modifying includes preheating, and/or precooling. For the purposes of this disclosure, "preheating" refers to a process of heating a power source beforehand to prepare the power source to be used. This is so, at least in part to set the temperature of the power source 1108 at the optimal temperature to its best operating temperature. Additionally or alternatively, this is so, at least in part to set the temperature of the power source 1108 at an optimal temperature to prepare for the next process of a supporting an operation of an electric aircraft 1104. For the purposes of this disclosure, an "optimal temperature" is a range of temperature at which a power source functions its best. When the power source 1108 at a temperature off from the optimal temperature gets charged, the power source 1108 may be damaged or lose its efficiency. As a non-limiting example, this is so, at least in part to set the temperature of the power source 1108 at the optimal temperature to receive charging at a higher rate, resulting in an overall faster recharge time. As another non-limiting example, when the power source 1108 at a temperature off from the optimal temperature gets charged, the power source 1108 may be permanently damaged. For the purposes of this disclosure, "precooling" refers to a process of cooling a power source beforehand to prepare the power source to be used. This is so, at least in part to set the temperature of the power source 1108 at the optimal temperature to prepare for the next process of a supporting an operation of an electric aircraft 1104. As a non-limiting example, this is so, at least in part to set the temperature of the power source 1108 at a temperature to receive charging at a higher rate, resulting in an overall faster recharge time. Persons skilled in the art, upon reviewing the entirety of this disclosure, will be aware of the various embodiments of power source preconditioning as described herein.

With continued reference to FIG. 11, in some embodiments, ground service equipment 1116 may manage a temperature of a power source 1108 of an electric aircraft 1104 using a coolant. For the purposes of this disclosure, "coolant" is any flowable heat transfer medium. As a non-limiting example, the coolant may include a liquid, a gas, a solid, and/or a fluid. In some embodiments, the coolant may include a compressible fluid and/or a non-compressible fluid. In some embodiments, the coolant may include ethylene glycol, propylene glycol, and the like. In some embodiments, the coolant may include a non-conductive liquid such as a fluorocarbon-based fluid, such as without limitation Fluorinert m from 3M of Saint Paul, Minnesota, USA. In some cases, the coolant may include air. In some embodiments, the ground service equipment 1116 may obtain the coolant from a coolant source 11120. The coolant source 11120 disclosed herein is further described below.

With continued reference to FIG. 11, ground service equipment 1116 includes a coolant source 11120. For the purposes of this disclosure, a "coolant source" is an origin, generator, or reservoir of a coolant. In an embodiment, the coolant source may be external of the ground service equipment 1116. In another embodiment, the coolant source 1120 may be inside of the ground service equipment 1116. In some embodiments, the coolant source 1120 may include corrosion-resistant outer housing as the coolant source may come into contact with the liquid or material within the housing, such as without limitation the coolant. For the purposes of this disclosure, "corrosion-resistant" refers to the ability to protect the substrate from corrosion. As a non-limiting example, the corrosion-resistant outer housing may include stainless steel, aluminum alloy, nickel-chromium alloy, iron-chromium-aluminum alloy, molybdenum disilicide, silicon carbide, copper, polypropylene, Polytetrafluoroethylene (PTFE), and the like.

With continued reference to FIG. 11, in some embodiments, ground service equipment 1116 includes a coolant heating system 1124. For the purposes of this disclosure, a "coolant heating system" is a system that is configured to increase thermal energy of a coolant. As a non-limiting example, the coolant heating system may heat a coolant from 65° F. to 75° F. In some embodiments, the coolant heating system 1124 may include a shape of a tube, a plate, a film, a pipe, and the like. In an embodiment, the coolant heating system 1124 may be immersed inside of a coolant source 1120. In another embodiment, the coolant heating system 1124 may wrap around the coolant source 1120. In some embodiments, the coolant heating system 1124 may be external to the coolant source 1120. The coolant heating system 1124 may be configured to increase thermal energy of a coolant using an electric resistance heating. In some embodiments, the coolant heating system 1124 may include an immersion heater. For the purposes of this disclosure, an "immersion heater" is a heater that is immersed inside a coolant source and configured to heat a coolant inside of the coolant source using an electric resistance heating. The immersion heater may be inserted through the wall of a container to heat the coolant within. The immersion heater may use an electric resistance heating element 1128 to heat the coolant inside of the coolant source 1120 until it reaches an optimal temperature.

With continued reference to FIG. 11, a coolant heating system 1124 includes an electric resistance heating element 1128. The coolant heating system 1124 may include the electric resistance heating element 1128 embedded inside a housing, such as a corrosion-resistant outer housing of the coolant source 1120, that can be attached or inserted to transfer heat. For the purposes of this disclosure, an "electric resistance heating element" is an element of a coolant heating system that is configured to increase thermal energy of a system using electric resistance heating. The electric resistance heating element 1128 may convert electrical energy into heat through the process of Joule heating. Electric current through the element encounters resistance, resulting in heating of the element. In an embodiment, the electric resistance heating element 1128 may include a resistance wire. For the purposes of this disclosure, a "resistance wire" is the actual resistance which is where the electrical load occurs. In some embodiments, the resistance wire may include a nichrome, Kanthal wire, Cupronicke alloy, etched foil, and the like. In some embodiments, the resistance wire may be straight, coiled, and the like. In another embodiment, the electric resistance heating element 1128 may include a sheath. For the purposes of this disclosure, a "sheath" is a part which contacts a coolant to be heated. As a non-limiting example, the sheath may include stainless steel, superalloy, and the like. In another embodiment, the electric resistance heating element 1128 may include an insulation. For the purposes of this disclosure, an "insulation" is an element that prevents the resistance wire contacting the sheath. In some embodiments, the electric resistance heating element 1128 may include a seal. The seal may prevent any contaminants from entering the coolant heating system 1124. Persons skilled in the art, upon reviewing the entirety of this disclosure, will be aware of the various electric resistance heating elements 1128 used for the coolant heating system 1124.

With continued reference to FIG. 11, for the purposes of this disclosure, an "electric resistance heating," or also called "joule heating" is a process by which the passage of an electric current through a conductor produces heat. For the purposes of this disclosure, "heat" is the flow of thermal energy. The Joule heating is also referred to, in this disclosure, as resistive, resistance, or Ohmic heating. Joule-Lenz law states that power of heat generated by a coolant heating system 1124 is proportional to a product of its resistance and a square of the current, see below.

$$P \propto I^2 R$$

where P is power of heat generated, for example in Watts, I is electric current within the coolant heating system 1124, for example in Amps, and R is resistance of the coolant heating system 1124, for example in Ohms.

With continued reference to FIG. 11, in some embodiments, ground service equipment 1116 may include a coolant cooling system 1118. For the purposes of this disclosure, a "coolant cooling system" is a system configured to remove thermal energy from a coolant. As a non-limiting example, the coolant cooling system 1118 may cool a coolant from 75° F. to 65° F. In some embodiments, the coolant cooling system 1118 may be configured to remove thermal energy from the coolant to an optimal temperature. In some embodiments, the coolant cooling system 1118 may include a fan, a heat exchanger, a heat sink, a chiller, and the like. In some embodiments, the coolant cooling system 1118 may include a shape of a tube, a plate, a pipe, and the like. In some embodiments, the coolant cooling system 1118 may include a liquid-to-liquid cooling system, closed-loop dry cooling system, open-loop evaporative system, closed-loop evaporative system, chilled water system, and the like. In an embodiment, the coolant cooling system 1118 may be immersed inside of a coolant source 1120. In another embodiment, the coolant cooling system 1118 may wrap around the coolant source 1120. In some embodiments, the coolant cooling system 1118 may be external to the coolant source 1120.

With continued reference to FIG. 11, ground service equipment 1116 may include a pump. As used in this disclosure, a "pump" is a mechanical source of power that converts mechanical power into fluidic energy. Pump may include a substantially constant pressure pump (e.g., centrifugal pump) or a substantially constant flow pump (e.g., positive displacement pump, gear pump, and the like). Pump can be hydrostatic or hydrodynamic. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with a coolant source 1120. In some cases, the coolant source 1120 may be unpressurized and/or vented. Alternatively, the coolant source 1120 may be pressurized and/or sealed.

With continued reference to FIG. 11, in some embodiments, a pump may be configured to provide a coolant flow between ground service equipment 1116 and a power source 1108 of an electric aircraft 1104 to precondition the power source 1108. In some embodiments, the pump may be configured to pump a coolant from a coolant source 1120 to precondition the power source 1108. As a non-limiting example, the pump may pump a coolant from the coolant source 1120 to cool power source 1108 of an electric aircraft 1104. As another non-limiting example, the pump may pump a coolant from the coolant source 1120 to heat the power source 1108 of the electric aircraft 1104. In some embodiments, the pump may be configured to pump a coolant from the coolant source 1120 to cool and/or heat the power source 1108 while charging. In some embodiments, the pump may be configured to pump a coolant from a spent coolant reservoir 1144. In some embodiments, the pump may be configured to pump a coolant into the spent coolant reservoir 1144 after a use of the coolant.

With continued reference to FIG. 11, in some embodiments, a pump may include a negative pressure pump 1130. For the purposes of this disclosure, a "negative pressure pump" is a pump that pulls a coolant out of a power source of an electric aircraft. The negative pressure pump 1130 may be consistent with a pump disclosed above. For the purposes of this disclosure, "negative pressure" is a pressure within a system that is less than the environment that surrounds the system. Consequently, if there is any leak or an outlet from the positively pressured system, air and/or any substance may get sucked into the surrounding environment. Using this, a ground service equipment 1116 may use the negative pressure pump 1130 to pump the coolant out of the power source 1108 of the electric aircraft 1104. In some embodiments, the negative pressure pump 1130 may pump the coolant out of the power source 1108 once preconditioning of the power source 1108 is done by a positive pressure pump 1132. In some embodiments, the negative pressure pump 1130 may pump the coolant out of the power source 1108 before preconditioning of the power source 104 is done by the positive pressure pump 1132. In some embodiments, the negative pressure pump 1130 may pump the coolant out of the power source 1108 after charging is done. In some embodiments, the negative pressure pump 1130 may pump the coolant out of the power source 1108 before the charging is done.

With continued reference to FIG. 11, in some embodiments, a pump may include a positive pressure pump 1132. For the purposes of this disclosure, a "positive pressure pump" is a pump that moves fluid using positive pressure. In some embodiments, the positive pressure pump 1132 may be configured to pump a coolant into a power source 1108 of an electric aircraft 1104. As a non-limiting example, the positive pressure pump 1132 may pump a coolant into a cooling circuit of the power source 1108. For the purposes of this disclosure, a "cooling circuit" is a passage of a flow of a fluid. As a non-limiting example, the cooling circuit may allow a coolant flow in the power source 1108. The cooling circuit may include a thermal conduit. For the purposes of this disclosure, "positive pressure" is a pressure within a system that is greater than the environment that surrounds the system. Consequently, if there is any leak or an outlet from the positively pressured system, it will egress into the surrounding environment. As a non-limiting example, the positive pressure pump 1132 may obtain a cooled coolant from a coolant source 1120 and pump the cooled coolant to cool the power source 1108. As another non-limiting example, the positive pressure pump 1132 may obtain a heated coolant from the coolant source 1120 and pump the heated coolant into the power source 1108.

With continued reference to FIG. 11, ground service equipment may include a filter 1134. For the purposes of this disclosure, a "filter" is a material or device that allows certain substances to pass through it, while keeping other substances out. In some embodiments, the filter 1134 may include a deionizing filter. For the purposes of this disclosure, a "deionizing filter" is a filter that is configured to deionize a fluid. For the purposes of this disclosure, "deionization" refers to the removal of ions through the process of ion exchange, wherein the ions are electrically charged atoms or molecules found in a fluid that have either a net negative or positive charge. In some embodiments, the deionizing filter may be configured to remove mineral ions from the coolant. As a non-limiting example, the mineral ions may include cations, such as without limitation, sodium, calcium, iron, copper, and the like. As another non-limiting example, the mineral ions may include anions such as without limitation, chloride, sulfate, and the like. The deionizing filter may remove total dissolved solids from the coolant using ion exchange resins, controlling the electric charge of ions in the water to remove the total dissolved solids. The ion exchange resins may include cationic resin, wherein the cationic resin may include negatively charged sulfonic acid group. The cationic resin may attract positively charged ions in the coolant and release an equivalent amount of hydrogen ions. The ion exchange resins may include anionic resin, wherein the anionic resin may include positively charged ammonium group. The anionic resin may attract negatively charged and release an equivalent amount of hydroxide.

With continued reference to FIG. 11, in some embodiments, ground service equipment 1116 may include a valve 1136. For the purposes of this disclosure, a "valve" is a device for controlling a flow of fluid through a passage. In some embodiments, the valve 1136 have a plurality of positions between fully open to fully closed. The valve 1136 may be controlled by electrical, hydraulic, pneumatic actuators, and/or the like. For the purposes of this disclosure, an "actuator" is a component of a machine that is responsible for moving and/or controlling a mechanism or system. The actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, the actuator may have an energy or power source other than control signal. This may include a main energy source, which may include for example electric power, hydraulic power, pneumatic power, mechanical power, and the like. In some cases, upon receiving a control signal, the actuator may respond by converting source power into mechanical motion. In some cases, the actuator may be understood as a form of automation or automatic control.

With continued reference to FIG. 11, in some embodiments, an actuator may include a hydraulic actuator. The hydraulic actuator may consist of a cylinder or fluid motor that uses hydraulic power to facilitate mechanical operation. Output of the hydraulic actuator may include mechanical motion, such as without limitation linear, rotatory, or oscillatory motion. In some cases, the hydraulic actuator may employ a liquid hydraulic fluid. As liquids, in some cases, are incompressible, a hydraulic actuator can exert large forces. Additionally, as force is equal to pressure multiplied by area, the hydraulic actuators may act as force transformers with changes in area (e.g., cross sectional area of cylinder and/or piston). An exemplary hydraulic cylinder may consist of a hollow cylindrical tube within which a piston can slide. In some cases, the hydraulic cylinder may be considered single acting. The single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. The double acting may be used when pressure is applied substantially on each side of a piston; any difference in resultant force between the two sides of the piston causes the piston to move.

With continued reference to FIG. 11, in some embodiments, an actuator may include a pneumatic actuator. In some cases, the pneumatic actuator may enable considerable forces to be produced from relatively small changes in gas pressure. In some cases, the pneumatic actuator may respond more quickly than other types of actuators, for example hydraulic actuators. The pneumatic actuator may use compressible fluid (e.g., air). In some cases, the pneumatic actuator may operate on compressed air. Operation of hydraulic and/or pneumatic actuators may include control of one or more valves, circuits, fluid pumps, and/or fluid manifolds.

With continued reference to FIG. 11, an actuator may be an electric actuator. In some embodiments, the electric actuator may include any electromechanical actuators, linear motors, and the like. In some cases, the actuator may include an electromechanical actuator. The electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. The electric actuator may include a linear motor. The linear motors may differ from electromechanical actuators, as power from linear motors is output directly as translational motion, rather than output as rotational motion and converted to translational motion. In some cases, the linear motor may cause lower friction losses than other devices. The linear motors may be further specified into at least 3 different categories, including flat linear motor, U-channel linear motors and tubular linear motors. The linear motors may be directly controlled by a control signal for controlling one or more linear motor parameters. Exemplary linear motor parameters include without limitation position, force, velocity, potential, and current.

With continued reference to FIG. 11, in some embodiments, an actuator may include a mechanical actuator. In some cases, the mechanical actuator may function to execute movement by converting one kind of motion, such as rotary motion, into another kind, such as linear motion. An exemplary mechanical actuator may include a rack and pinion. In some cases, a mechanical power source, such as a power take off may serve as power source for the mechanical actuator. The mechanical actuators may employ any number of mechanisms, including for example without limitation gears, rails, pulleys, cables, linkages, and the like.

With continued reference to FIG. 11, in some embodiments, the valve 1136 may include a non-return valve. For the purposes of this disclosure, a "non-return valve" is a valve that allows a fluid to flow in only one direction. In some embodiments, the valve 1136 may include a control valve. For the purposes of this disclosure, a "control valve" is a valve used to control fluid flow by varying the size of the flow passage. As a non-limiting example, the valve 1136 may open to allow the flow of the coolant. As another non-limiting example, the valve 1136 may close to prevent the flow of the coolant. In some embodiments, the valve 1136 may be configured to control a flow of a coolant between ground service equipment 1116 and an electric aircraft 1104. In an embodiment, a user may manually control a valve 1136 to control a flow of coolant. As a non-limiting example, the user may manually turn, twist, or by any method to open and/or close the valve 1136. For the purposes of this disclosure, a "user" is any person using a system. In some embodiments, the valve 1136 may be communicatively connected to a controller 1152. As a non-limiting example, the controller 1152 may open and/or close the valve 1136 as a function of a user input from a user input device 1140. In an embodiment, the control valve 1136 may be configured to control a flow of coolant as directed by a signal from a controller 1152. In some embodiments, the control valve may be configured to control a pressure of a flow of coolant as directed by a signal from the controller 1152. In another embodiment, the control valve may be configured to control a flow rate of coolant as directed by a signal from a controller 1152. The user input device 1140 and the controller 1152 disclosed herein is further described below.

With continued reference to FIG. 11, in some embodiments, ground service equipment 1116 may include a user input device 1140. For the purposes of this disclosure, a "user input device" is any device that a user can input a user input. In an embodiment, the user input device 1140 may include a touch screen. As a non-limiting example, a user may touch a screen to input a user input. In another embodiment, a flight controller of an electric aircraft 1104 may be used to input a user input. In some embodiments, the flight controller may employ a wireless and/or wired communication to input the user input. The flight controller disclosed herein is further described with respect to FIG. 110. In some embodiments, the user input device 1140 may include a switch. For the purposes of this disclosure, a "switch" is an electrical component that can disconnect or connect the conducting path in an electrical circuit. As a non-limiting example, the switch may include a toggle switch, rotary switch, mercury switch, push-button switch, reversing switch, relay, circuit breaker, and the like. In some embodiments, the user input device 1140 may be communicatively connected to a controller 1152. In some embodiments, the user input device 1140 may be configured to transmit a user input to a controller 1152. As a non-limiting example, a user may control a switch to generate the user input. In some embodiments, the user input device 1140 may be configured to transmit the switch signal to the controller 1152 to control a valve 1136. As a non-limiting example, a user may turn on the switch to open the valve 1136 to allow a flow of coolant. As another non-limiting example, the user may turn off the switch to fully close the valve 1136 to stop the coolant flow. For the purposes of this disclosure, a "user input" is any data received from a user. As a non-limiting example, a user input may include 'start heating a coolant,' 'start cooling a coolant,' 'stop heating a coolant,' 'stop cooling a coolant,' 'open a valve 1136,' 'close a valve 1136,' and the like. As another non-limiting example, a user input may include an optimal temperature, an optimal flow rate, and the like.

With continued reference to FIG. 11, for the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 11, in some embodiments, ground service equipment 1116 may include a spent coolant reservoir 1144. For the purposes of this disclosure, a "spent coolant reservoir" is a container configured to collect used coolant from the aircraft. The spent coolant reservoir 1144 may be a container made of nonporous, nonreactive materials such as plastics or metals. The spent coolant reservoir 1144 may be located within the ground service equipment 1116 or separately from the ground service equipment 1116. The spent coolant reservoir 1144 may be used to store a coolant purged from an electric aircraft 1104. The coolant in spent coolant reservoir 1144 may be reused.

With continued reference to FIG. 11, in some embodiments, ground service equipment 1116 may include a cable module 1112. In some embodiments, the cable module 1112 may be configured to deliver the coolant from ground service equipment 1116 to an electric aircraft 1104. For the purposes of this disclosure, a "cable module" is a cord which is configured to support communication between mating components. As a non-limiting examples, a port 1110 of an electric aircraft 1104 and ground service equipment 1116 may be mating components. In some embodiments, a cable module 1112 may be mechanically coupled to the ground service equipment 1116. In some embodiments, the cable module 1112 may be fluidically connected to the pump and/or a reservoir, such as without limitation a coolant source 1120 and a spent coolant reservoir 1144. For the purposes of this disclosure, "fluidically connected" means that fluid is able to flow from one of the fluidly connected elements to the other, notwithstanding any elements that temporarily or optionally restrict fluid flow, such as, as non-limiting examples, a valve 1136. The cable module 1112 may be removable from the ground service equipment 1116. The cable module 1112 may be permanently attached to the ground service equipment 1116. In some embodiments, a cable module 1112 may be communicatively connected to a controller 1152. In some embodiments, the cable module 1112 may include a user input device 1140. As a non-limiting example, the cable module 1112 may include a toggle switch.

With continued reference to FIG. 11, in some embodiments, a cable module 1112 may include a connector 1146. For the purposes of this disclosure, a "connector" is a distal end of a cord. In some embodiments, the connector 1146 of the cable module 1112 may be configured to interface with a port 1110 of an electric aircraft 1104. In some embodiments, the connector 1146 may be configured to receive a user input from a user. The user input 1136 disclosed herein is further described below. In some embodiments, the connector 1146 may include a user input device 1140. The user input device 1140 disclosed herein is further described below. As a non-limiting example, the connector 1146 may include a button that the user may push to start and/or stop pumping a coolant into a power source 1108. The connector 1146 may include a button that the user may push to start and/or stop pumping a coolant out of a power source 1108. The connector 1146 may include a switch that the user may control to start and/or stop pumping a coolant into a power source 1108. The connector 1146 may include a switch that the user may control to start and/or stop pumping a coolant out of a power source 1108. The connector 1146 may include a screen that the user may touch to start and/or stop pumping a coolant into a power source 1108. The connector 1146 may include a screen that the user may touch to start and/or stop pumping a coolant out of a power source 1108. Additionally without limitation, the connector 1146 of the cable module 1112 may include any other element that enables a user to control to start and/or stop pumping in and/or pumping out a coolant to and/or from the power source 1108.

With continued reference to FIG. 11, in some embodiments, a system 1100 may include at least a sensor 1148. For the purposes of this disclosure, a "sensor" is a device that is configured to detect an input and/or a phenomenon and transmit information related to the detection. For example, and without limitation, the at least a sensor 1148 may transduce a detected phenomenon, such as without limitation, temperature, voltage, current, pressure, and the like, into a sensed signal. The at least a sensor 1148 may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor 1148 may include circuitry, computing devices, electronic components or a combination thereof that translates into at least an electronic signal configured to be transmitted to another electronic component. In a non-limiting embodiment, the at least a sensor 1148 may include a plurality of sensors comprised in a sensor suite. In one or more embodiments, and without limitation, the at least a sensor 1148 may include a plurality of sensors. In one or more embodiments, and without limitation, the at least a sensor 1148 may include one or more temperature sensors. For the purposes of this disclosure, a "temperature sensor" is a sensor that detects a temperature of a system. As a non-limiting example, the temperature sensor may measure a temperature of a coolant, a coolant source 1120, a power source 1108, and the like. Then, the temperature sensor may transmit a signal of the temperature of the coolant, the coolant source 1120, the power source 1108, and the like to a controller 1152. In one or more embodiments, the at least a sensor 1148 may include thermocouples, thermistors, thermometers, infrared sensors, resistance temperature sensors (RTDs), semiconductor based integrated circuits (ICs), a combination thereof, or another undisclosed sensor type, alone or in combination. For the purposes of this disclosure and as would be appreciated by someone of ordinary skill in the art, "temperature" is a measure of the heat energy of a system. Temperature, as measured by any number or combinations of sensors present within the at least a sensor 1148, may be measured in Fahrenheit (° F.), Celsius (° C.), Kelvin (° K), or another scale alone or in combination. In some embodiments, the at least a sensor 1148 may include a flow sensor. For the purposes of this disclosure, a "flow sensor" is a sensor that measures a flow of a fluid. The flow sensor may measure the flow of the fluid and then transmit a signal of the flow of the fluid to a controller 1152. In an embodiment, the flow sensor may measure a volumetric flow rate. For the purposes of this disclosure, a "volumetric flow rate" refers to the volume of fluid that passes a measurement point over a period of time. In another embodiment, the flow sensor may measure a mass flow rate. For the purposes of this disclosure, a "mass flow rate" refers to the amount of mass of fluid that passes a specific point over a period of time. In some embodiments, the flow sensor may be configured to measure a speed of a flow. For the purposes of this disclosure, a "speed" of a flow refers to an indication of how fast a substance moves through a conduit from one place to another. In some embodiments, the flow sensor may be configured to measure a distance of a flow. For the purposes of this disclosure, a "distance" of a flow refers to a distance a substance moves over a period of time. As a non-limiting example, the flow sensor may measure a flow rate of a coolant between ground service equipment 1116 and an electric aircraft 1104. In some embodiments without limitation, the flow sensor may include ultrasonic meter, electromagnetic meter, Karman vortex meter, paddlewheel meter, floating element meter, thermal meter, differential pressure types meter, and the like. Persons skilled in the art, upon reviewing the entirety of this disclosure, will be aware of various ways in which steps, sequences of steps, and/or processing tasks to detect the flow of fluids for the disclosure.

With continued reference to FIG. 11, in some embodiments, at least a sensor 1148*a* may be communicatively connected to a coolant source 1120. The at least a sensor 1148*a* communicatively connected to the coolant source 1120 may detect and transmit a temperature of a coolant of the coolant source 1120 to controller 1152. As a non-limiting example, the at least a sensor 1148*a* may detect the temperature of the coolant is 60° F. and transmit it to a controller 1152. As another non-limiting example, the at least a sensor 1148*a* may detect the temperature of the coolant is 70° F. as the coolant is getting heated by a coolant heating system 1124 and transmit it to the controller 1152. As another non-limiting example, the at least a sensor 1148*a* may detect the temperature of the coolant is 75° F. after the coolant is heated by the coolant heating system 1124 and transmit it to the controller 1152. As another non-limiting example, the at least a sensor 14*a*8 may detect the temperature of the coolant is 70° F. as the coolant is getting cooled by a coolant cooling system 1118 and transmit it to the controller 1152. As a non-limiting example, at least a sensor 1148*a* may detect the temperature of a coolant as the coolant is getting delivered from ground service equipment 1116 and an electric aircraft 1104.

With continued reference to FIG. 11, in some embodiments, at least a sensor 1148*b* may be communicatively connected to a power source 1108. The at least a sensor 1148*b* communicatively connected to the power source 1108 may detect and transmit a temperature of a power source 1108. As a non-limiting example, the at least a sensor 1148*b* may detect the temperature of the power source 1108 is 50° F. and transmit it to a controller 1152. As another non-limiting example, the at least a sensor 1148*b* may detect the temperature of the power source 1108 is 65° F. as the power source 1108 is getting heated by ground service equipment 1116 and transmit it to the controller 1152. As another non-limiting example, the at least a sensor 1148*b* may detect the temperature of the power source 1108 is 75° F. after the coolant is heated by the ground service equipment 1116 and transmit it to the controller 1152. As another non-limiting example, the at least a sensor 1148*b* may detect the temperature of the power source 1108 is 70° F. as the power source 1108 is getting cooled by the ground service equipment 1116 and transmit it to the controller 1152.

With continued reference to FIG. 11, a system 1100 includes a controller 1152. A controller 1152 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. A controller 1152 may include a single computing device operating independently, or may include two or more computing device operating in concert, in parallel, sequentially or the like; two or more computing devices may be included together in a single computing device or in two or more computing devices. A controller 1152 may interface or communicate with one or more additional devices as described below in further detail via a network interface device. Network interface device may be utilized for connecting a controller 1152 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A controller 1152 may include but is not limited to, for example, a computing device or cluster of computing devices in a first location and a second computing device or cluster of computing devices in a second location. A controller 1152 may include one or more computing devices dedicated to data storage, security, distribution of traffic for load balancing, and the like. A controller 1152 may distribute one or more computing tasks as described below across a plurality of computing devices of computing device, which may operate in parallel, in series, redundantly, or in any other manner used for distribution of tasks or memory between computing devices. A controller 1152 may be implemented using a "shared nothing" architecture in which data is cached at the worker, in an embodiment, this may enable scalability of system 1100 and/or computing device.

With continued reference to FIG. 11, a controller 1152 may be designed and/or configured to perform any method, method step, or sequence of method steps in any embodiment described in this disclosure, in any order and with any degree of repetition. For instance, a controller 1152 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The controller 1152 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Additionally without limitation, the controller 1152 disclosed herein may be consistent with a computing device described with respect to FIG. 1112

With continued reference to FIG. 11, a controller 1152 is communicatively connected to ground service equipment 1116. In some embodiments, the controller 1152 may be configured to receive a user input from a user input device 1140. The user input may be any user input disclosed in the entirety of this disclosure. The controller 1152 is configured to control a coolant heating system 1124. In some embodiments, the controller 1152 may be configured to control the coolant heating system 1124 as a function of the user input. As a non-limiting example, the controller 1152 may initiate the coolant heating system 1124 to heat a coolant of a coolant source 1120 when the controller 1152 receives a user input of 'start heating a coolant.' As another non-limiting example, the controller 1152 may initiate the coolant heating system 1124 to heat the coolant of the coolant source 1120 when the controller 1152 receives 'start heating a battery.' As another non-limiting example, the controller 1152 may stop heating the coolant when the controller 1152 receives 'stop heating a coolant.' As another non-limiting example, the controller 1152 may activate the coolant heating system 1124 to heat the coolant to 75° F. when the controller 1152 receives an optimal temperature of the coolant, 75° F., from a user input device 1140. In some embodiments, the controller 1152 may be configured to control the coolant heating system 1124 as a function of a predetermined temperature. As a non-limiting example, the controller may activate the coolant heating system 1124 to be automatically heated to the predetermined temperature of a coolant. As another non-limiting example, the controller 1152 may activate the coolant heating system 1124 to be automatically heated to the predetermined temperature of a power source 1108. For the purposes of this disclosure, a "predetermined temperature" is a temperature that is saved in a computing device as a default temperature for a component and/or a device. In some embodiments, the predetermined temperature may be stored in a database. The database disclosed herein is further described below. As a non-limiting example, the controller 1152 may include a predetermined temperature of a coolant as 70° F. As a non-limiting example, the controller 1152 may include a predetermined temperature of a power source 1108 as 70° F.

With continued reference to FIG. 11, In some embodiments, a controller 1152 may be communicatively connected to at least a sensor 1148. In some embodiments, the controller 1152 may be configured to receive a signal from the at least a sensor 1148. The signal from the at least a sensor 1148 disclosed herein is described above. In some embodiments, the controller 1152 may be configured to control a coolant heating system 1124 as a function of the signal from the at least a sensor 1148 and a predetermined temperature. As a non-limiting example, the signal from the at least a sensor 1148 may include a temperature of a power source

1108. When the controller 1152 receives the temperature of the power source 1108 that is below a predetermined temperature of the power source 1108, the controller 1152 may activate the coolant heating system 1124 to increase thermal energy of a coolant. As another non-limiting example, when the controller 1152 receives the temperature of the coolant is heated to the predetermined temperature, the controller 1152 may stop the coolant heating system 1124. In some embodiments, the controller 1152 may be configured to control the coolant heating system 1124 as a function of a signal from at least a sensor 1148 and the user input. As a non-limiting example, the signal from the at least a sensor 1148 may include a temperature of a power source 1108. When the controller 1152 receives the temperature of the power source 1108 that is below an optimal temperature of the power source 1108 received from a user input device 1140, the controller 1152 may activate the coolant heating system 1124 to increase thermal energy of a coolant. As another non-limiting example, when the controller 1152 receives the temperature of the coolant is heated to the optimal temperature of the power source 1108, the controller 1152 may stop the coolant heating system 1124. As another non-limiting example, the signal from the at least a sensor 1148 may include a temperature of a coolant. When the controller 1152 receives the temperature of the coolant that is below an optimal temperature of the coolant received from a user input device 1140, the controller 1152 may activate the coolant heating system 1124 to increase thermal energy of the coolant. As another non-limiting example, when the controller 1152 receives the temperature of the coolant is heated to the optimal temperature of the coolant, the controller 1152 may stop the coolant heating system 1124.

With continued reference to FIG. 11, in some embodiments, a system 1100 may include a database. The database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 11, in some embodiments, a controller 1152 may be configured to control a coolant cooling system 1118. In some embodiments, the controller 1152 may be configured to control the coolant cooling system 1118 as a function of a user input. As a non-limiting example, the controller 1152 may initiate the coolant cooling system 1118 to cool a coolant of a coolant source 1120 when the controller 1152 receives a user input of 'start cooling a coolant.' As another non-limiting example, the controller 1152 may initiate the coolant cooling system 1118 to cool the coolant of the coolant source 1120 when the controller 1152 receives 'start cooling a battery.' As another non-limiting example, the controller 1152 may stop cooling the coolant when the controller 1152 receives 'stop cooling a coolant.' As another non-limiting example, the controller 1152 may activate the coolant cooling system 1118 to cool the coolant to 75° F. when the controller 1152 receives an optimal temperature of the coolant, 75° F., from a user input device 1140. In some embodiments, the controller 1152 may be configured to control the coolant cooling system 1118 as a function of a predetermined temperature. As a non-limiting example, the controller may activate the coolant cooling system 1118 to be automatically cooled to the predetermined temperature of a coolant. As another non-limiting example, the controller 1152 may activate the coolant cooling system 1118 to be automatically cooled to the predetermined temperature of a power source 1108. In some embodiments, a controller 1152 may be configured to control the coolant cooling system 1118 as a function of a signal from at least a sensor 1148 and a predetermined temperature. As a non-limiting example, the signal from the at least a sensor 1148b may include a temperature of a power source 1108. When the controller 1152 receives the temperature of the power source 1108 that is above a predetermined temperature of the power source 1108, the controller 1152 may activate the coolant cooling system 1118 to remove thermal energy from a coolant. As another non-limiting example, when the controller 1152 receives the temperature of the coolant is cooled to the predetermined temperature, the controller 1152 may stop the coolant cooling system 1118. In some embodiments, the controller 1152 may be configured to control the coolant cooling system 1118 as a function of a signal from at least a sensor 1148 and the user input. As a non-limiting example, the signal from the at least a sensor 1148b may include a temperature of a power source 1108. When the controller 1152 receives the temperature of the power source 1108 that is above an optimal temperature of the power source 1108 received from a user input device 1140, the controller 1152 may activate the coolant cooling system 1118 to remove thermal energy from a coolant. As another non-limiting example, when the controller 1152 receives the temperature of the coolant that is cooled to the optimal temperature of the power source 1108, the controller 1152 may stop the coolant cooling system 1118. As another non-limiting example, the signal from the at least a sensor 1148a may include a temperature of a coolant. When the controller 1152 receives the temperature of the coolant that is above an optimal temperature of the coolant received from a user input device 1140, the controller 1152 may activate the coolant cooling system 1118 to remove thermal energy from the coolant. As another non-limiting example, when the controller 1152 receives the temperature of the coolant is cooled to the optimal temperature of the coolant, the controller 1152 may stop the coolant cooling system 1118.

With continued reference to FIG. 11, in some embodiments, a controller 1152 may be configured to control a valve 1136. As another non-limiting example, the controller 1152 may be configured to close the valve 1136 to reduce a flow rate of the coolant. As another non-limiting example, the controller 1152 may be configured to open the valve 1136 to increase the flow rate of the coolant. In some embodiments, the controller 1152 may be configured to control the valve 1136 as a function of a predetermined flow rate of a coolant. As a non-limiting example, the controller 1152 may automatically set a flow rate of a coolant to be the predetermined flow rate of the coolant open the valve 1136 to flow the coolant at the predetermined flow rate. In some embodiments, the controller 1152 may be configured to control the valve 1136 as a function of an optimal flow rate of a coolant. As a non-limiting example, the controller 1152 may automatically set a flow rate of a coolant to be the optimal flow rate of the coolant and open the valve 1136 to flow the coolant at the optimal flow rate. In some embodiments, the controller 1152 may be configured to control a valve as a function of a signal from at least a sensor 1148, wherein the at least a sensor may be a temperature sensor. As a non-limiting example, the controller 1152 may receive a temperature of a power source 1108. When the temperature of the power source 1108 is below and/or above an optimal temperature of the power source 1108, the controller 1152 may open and/or close the valve 1136 to provide a coolant flow to the power source 1108. As another non-limiting example, the controller 1152 may receive a temperature of a coolant. Then, when the temperature of the coolant is heated and/or cooled to an optimal temperature, the controller 1152 may open the valve 1136 to start providing a coolant flow. In some embodiments, the controller 1152 may be configured to control the valve 1136 as a function of a signal from at least a sensor 1148 and a predetermined flow rate of a coolant. As a non-limiting example, the signal from the at least a sensor 1148 may include a flow rate of a coolant. When the controller 1152 receives the flow rate of a coolant that is below and/or above a predetermined flow rate of a coolant, the controller 1152 may open and/or close the control valve 1136. In some embodiments, the controller 1152 may be configured to control the valve 1136 as a function of a signal from at least a sensor 1148 and an optimal flow rate of a coolant. As a non-limiting example, the signal from the at least a sensor 1148 may include a flow rate of a coolant. When the controller 1152 receives the flow rate of a coolant that is below and/or above an optimal flow rate of a coolant received from a user input device 1140, the controller 1152 may open and/or close the control valve 1136. For the purposes of this disclosure, a "predetermined flow rate" is a flow rate that is saved in a computing device as a default flow rate for a component and/or a device. The flow rate disclosed herein may be consistent with a coolant flow disclosed in the entirety of this disclosure. In some embodiments, the predetermined flow rate may be stored in a database. As a non-limiting example, the controller 1152 may include a predetermined flow rate of a coolant as 350 L/h. As a non-limiting example, the controller 1152 may include a predetermined flow rate of a coolant as be 550 L/h.

With continued reference to FIG. 11, in some embodiments, a controller 1152 may be configured to control a positive pressure pump 1132. As a non-limiting example, the controller 1152 may activate the positive pressure pump 1132. As another non-limiting example, the controller 1152 may deactivate the positive pressure pump 1132. In some embodiments, the controller 1152 may be configured to control the positive pressure pump 1132 as a function of a predetermined flow rate of a coolant. As a non-limiting example, the controller 1152 may automatically set a flow rate of a coolant to be the predetermined flow rate of the coolant and the controller 1152 may activate the positive pressure pump 1132 to pump the coolant at the predetermined flow rate. In some embodiments, the controller 1152 may be configured to control the positive pressure pump 1132 as a function of an optimal flow rate of a coolant. As a non-limiting example, the controller 1152 may automatically set a flow rate of a coolant to be the optimal flow rate of the coolant and the controller 1152 may activate the positive pressure pump 1132 to pump the coolant at the optimal flow rate. In some embodiments, the controller 1152 may be configured to control the valve 1136 as a function of a signal from at least a sensor 1148 and a predetermined flow rate of a coolant. As a non-limiting example, the signal from the at least a sensor 1148 may include a flow rate of a coolant. When the controller 1152 receives the flow rate of a coolant that is below and/or above a predetermined flow rate of a coolant, the controller 1152 may activate and/or deactivate the positive pressure pump 1132. In some embodiments, the controller 1152 may be configured to control the positive pressure pump 1132 as a function of a signal from at least a sensor 1148 and an optimal flow rate of a coolant. As a non-limiting example, the signal from the at least a sensor 1148 may include a flow rate of a coolant. When the controller 1152 receives the flow rate of a coolant that is below and/or above an optimal flow rate of a coolant received from a user input device 1140, the controller 1152 may activate and/or deactivate the positive pressure pump 1132.

With continued reference to FIG. 11, in some embodiments, a controller 1152 may be configured to control a positive pressure pump 1132 as a function of a signal from at least a sensor 1148, wherein the at least a sensor 1148 may be a temperature sensor. As a non-limiting example, the controller 1152 may receive the signal from the temperature sensor, wherein the signal comprises a temperature of a power source 1108 of an electric aircraft 1104. When the temperature of the power source 1108 is within a temperature optimal range, the controller 1152 may not activate the positive pressure pump 1132. For the purposes of this disclosure, a "temperature optimal range" is a range of values of the temperature of a power source that is close enough to an optimal temperature of the power source so the temperature within the range can be considered as the optimal temperature. As a non-limiting example, the temperature optimal range may include 5° F., ±10° F., 15° F., 20° F., ±30° F., and the like. As a non-limiting example, when an optimal temperature of a power source 1108 is 1100° F., the temperature optimal range may include 15° F., which gives a range of values of the temperature from 85° F. to 115° F. In an embodiment, a power source 1108 with a temperature of a power source 1108 that is within the temperature optimal range may indicate that the power source 1108 does not need to be heated and/or cooled. In another embodiment, a power source 1108 with a temperature that is outside of the temperature optimal range may indicate that the power source 1108 needs to be heated and/or cooled. Then, the controller 1152 may activate a positive pressure pump 1132 to provide a heated and/or cooled coolant to the power source 1108. In some embodiments, when the temperature of the power source 1108 is an optimal temperature, the controller 1152 may stop the positive pressure pump 1132. As a non-limiting example, the controller 1152 may receive a temperature of a power source 1108 from a temperature sensor. When the optimal temperature is 1100° F. and the temperature of the power source 1108 is 1100° F., the controller 1152 may stop the positive pressure pump 1132.

With continued reference to FIG. 11, in some embodiments, a controller 1152 may be configured to control a negative pressure pump 1130. As a non-limiting example, the controller 1152 may activate the negative pressure pump 1130. As another non-limiting example, the controller 1152 may deactivate the negative pressure pump 1130. In an embodiment, the controller 1152 may be configured to activate the negative pressure pump 1130 when the controller 1152 deactivates a positive pressure pump 1132. As a non-limiting example, the controller 1152 may activate the negative pressure pump 1130 five seconds after the controller 1152 deactivates the positive pressure pump 1132. As a non-limiting example, the controller 1152 may activate the negative pressure pump 1130 simultaneously when the controller 1152 deactivates the positive pressure pump 1132. The timing of the activation of the negative pressure pump 1130 after deactivation of the positive pressure pump 1132 may vary, for example without limitation, 1 second, 3 seconds, 5 seconds, 10 seconds, 15 seconds, and the like. In some embodiments, a controller 1152 may be configured to control a negative pressure pump 1130 as a function of a signal from at least a sensor 1148, wherein the at least a sensor may be a temperature sensor. In some embodiments, the controller 1152 may activate the negative pressure pump 1130 when a temperature of a power source 1108 is an optimal temperature. As a non-limiting example, the controller 1152 may receive a temperature of a power source 1108 that is being heated and/or cooled by ground service equipment 1116. When the optimal temperature is 1100° F. and the temperature of the power source 1108 is 1100° F., the controller 1152 may activate the negative pressure pump 1130.

With continued reference to FIG. 11, in some embodiments, a system 1100 may include a display device 1156. For the purposes of this disclosure, a "display device" is a device that conveys information visually. As a non-limiting example, the display device 1156 may include smartphones, tablets, laptops, monitors, headsets, and the like. In an embodiment, the display device 1156 may convey information in a text format. In some embodiments, the display device 1156 may convey information in a video format. In some embodiments, the display device 1156 may convey information in an audio format. In some embodiments, the display device 1156 may convey information in animation. In some embodiments, ground service equipment 1116 may include the display device 1156. In some embodiments, an electric aircraft 1104 may include the display device 1156. In some embodiments, a controller 1152 may be communicatively connected to the display device 1156. In an embodiment, a controller 1152 may be configured to display a temperature of a power source 1108. In another embodiment, the controller 1152 may be configured to display a temperature of a coolant. In some embodiments, the controller 1152 may be configured to display a heating status of a coolant. For the purposes of this disclosure, a "heating status" refers to indication of how much a fluid is heated. In an embodiment, the heating status may include a comparison of a temperature of a coolant before getting thermal energy increased by a coolant heating system 1124 and a temperature of the coolant after getting thermal energy increased by the coolant heating system 1124. As a non-limiting example, the display device 1156 may display the heating status by showing a temperature of a coolant before getting thermal energy increased by a coolant heating system 1124, 65° F., and a temperature of the coolant as the coolant is getting thermal energy increased by the coolant heating system 1124. As another non-limiting example, the display device 1156 may display the heating status by showing the temperature of the coolant as the coolant is getting thermal energy increased by the coolant heating system 1124 and an optimal temperature of the coolant.

Figure 12:
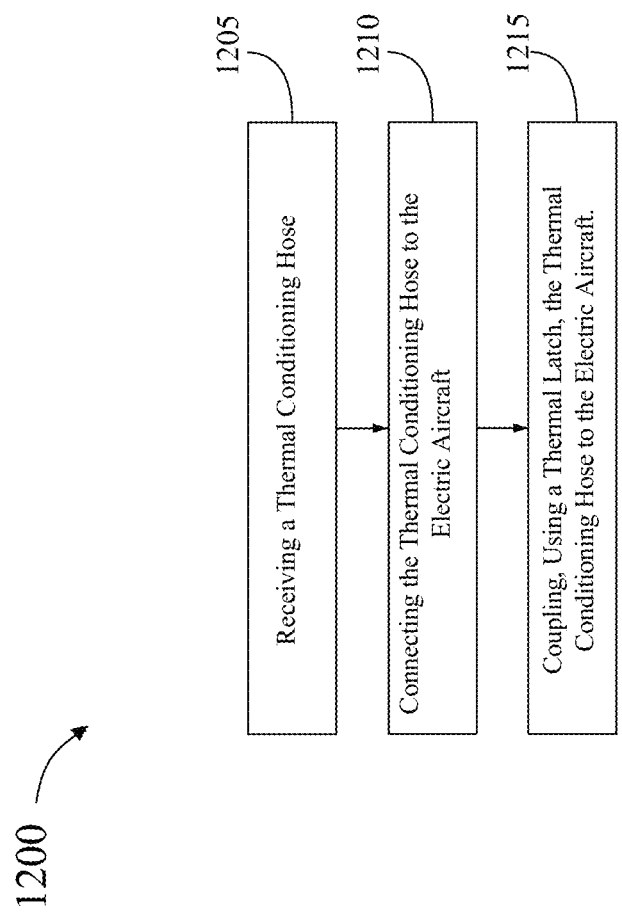
FIG. 12 is a flow diagram illustrating an exemplary method of use for an exemplary ground support cart in accordance with one or more embodiments of the present disclosure.

Referring now To FIG. 12, an exemplary method 1200 of locking a thermal conditioning hose to an electric aircraft is illustrated by way of a flow diagram. An electric aircraft may include any electric aircraft as described in this disclosure, for example with reference to FIGS. 1-11. Thermal conditioning hose may include any component capable or holding a fluid or a thermal medium described in this disclosure for example with reference to FIGS. 1-11. At step 1205, method 1200 includes receiving a thermal conditioning hose. Thermal conditioning hose includes a thermal medium flow path configured to contain a flow of a thermal medium, a thermal medium return path, the thermal medium return path configured to contain a flow of the thermal medium from an electric aircraft and a mating component, wherein the mating component is configured to make a connection with an electric aircraft port. In some cases, thermal medium is configured to flow into electric aircraft and cool at least on aircraft component. In some cases, thermal conditioning hose further includes a communication pin, wherein communication pin is configured to receive a signal from a remote device. In some cases, method may further include sensing a connecting property using a controller wherein the controller includes a sensing device. This may be implemented with reference to FIGS. 1-11.

With continued reference to FIG. 12, at step 1210, method 1200 includes connecting the thermal conditioning hose to the electric aircraft. Connecting may include positioning thermal conditioning hose in a correct orientation relative to electric aircraft. connecting may further include mating using a mating thermal conditioning hose, having a mating component, to an electric aircraft port. Connecting may further include aligning thermal medium flow path and thermal medium return path on thermal conditioning hose to electric aircraft. This may be implemented with reference to FIGS. 1-11.

With continued reference to FIG. 12, at step 1215, method 1200 includes coupling, using a thermal latch, the thermal conditioning hose to the electric aircraft. In some cases coupling using a thermal latch includes interacting within an engagement feature on the thermal latch, wherein the engagement feature is configured for manual engagement of the thermal latch. In some cases, coupling using the thermal latch includes coupling using an electronic latch, the electronic latch configured to couple the thermal conditioning hose to the electric aircraft as a function of receiving a coupling command. In some cases, thermal conditioning hose may further include a communication pin wherein the communication pin is configured to receive coupling command from electric aircraft. In some cases, thermal latch further includes an uncoupling sensor, the uncoupling sensor configured to uncouple the thermal conditioning hose from the electric aircraft upon the occurrence of an uncoupling event. In some cases, thermal latch is removably attached to thermal conditioning hose. This may be implemented with reference to FIGS. 1-11.

With continued reference to FIG. 12, method may further include charging using a charging connector, the charging connector configured to charge electric aircraft. This may be implemented It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
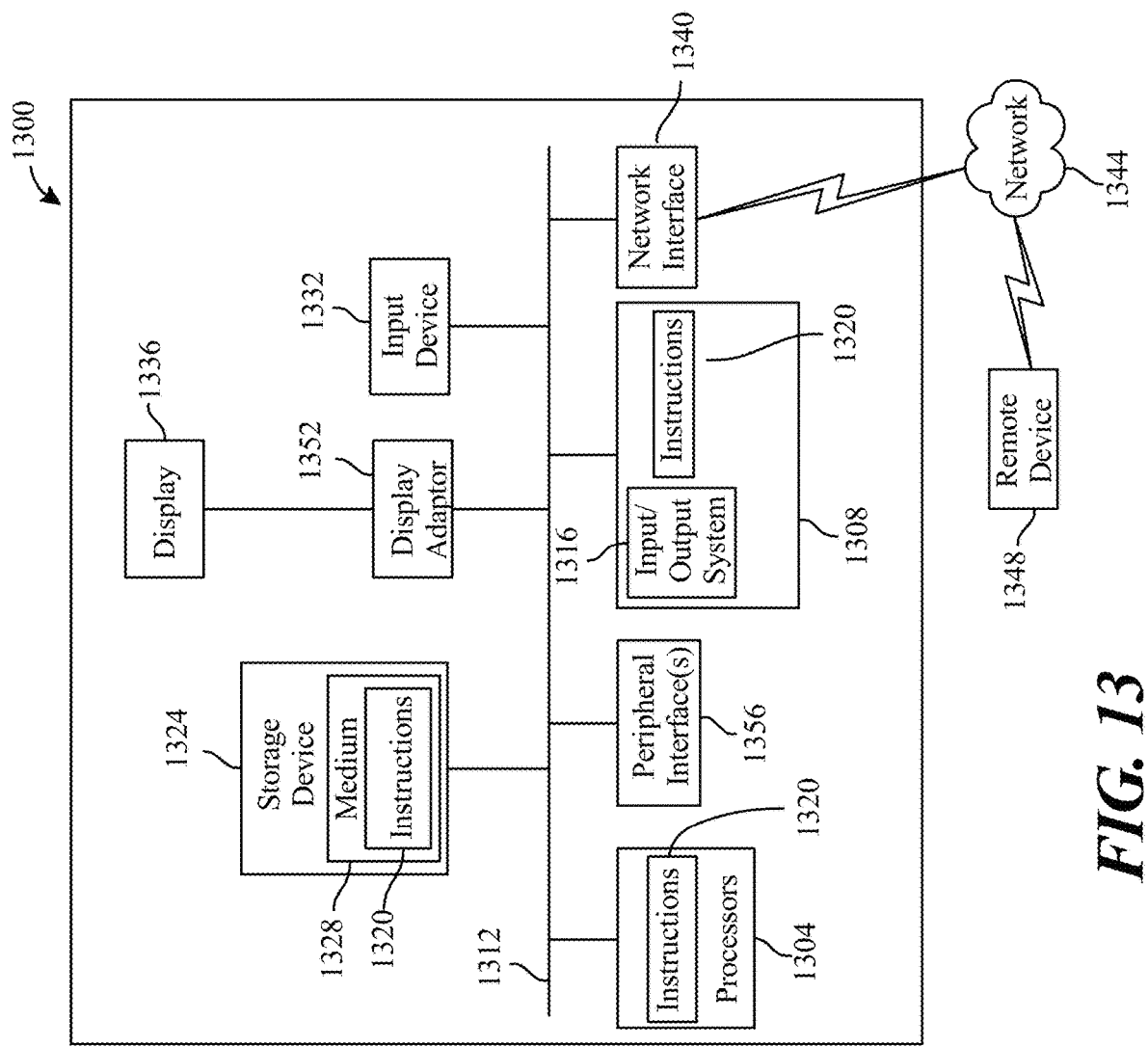
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1704 may be organized according to Von Neumann and/or Harvard architecture as a non-limiting example. Processor 1704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 190. A network interface device, such as network interface device 190, may be utilized for connecting computer system 1300 to one or more of a variety of networks, such as network 194, and one or more remote devices connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 194, may employ a wired and/or a wireless mode of communication. In general, any network topology may be used. Information (e.g., data, software 1320, etc.) may be communicated to and/or from computer system 1300 via network interface device.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a locking thermal conditioning hose for an electric aircraft comprising an on-board computing device, wherein the apparatus comprises:
   a thermal conditioning hose, wherein the thermal conditioning hose comprises:
      a cable separate from a charging connecter for the electric aircraft;
      a thermal medium flow path configured to contain a flow of a thermal medium;
      a thermal medium return path, the thermal medium return path configured to contain a flow of the thermal medium from the electric aircraft; and
      a mating component, wherein the mating component is configured to make a connection with an electric aircraft port; and
   a thermal latch configured to couple the thermal conditioning hose to the electric aircraft, wherein the thermal latch comprises a controller communicatively connected to the on-board computing device of the electric aircraft, wherein the controller is configured to:
      receive a coupling command from the on-board computing device; and
      control the coupling of the thermal latch to the electric aircraft based on the coupling command.

2. The apparatus of claim 1, wherein the flow of the thermal medium is configured to flow into the electric aircraft and cool at least one aircraft component.

3. The apparatus of claim 1, wherein the thermal conditioning hose comprises a communication pin, the communication pin configured to receive a signal from a remote device.

4. The apparatus of claim 1, wherein the controller is communicatively connected to a sensing device of the thermal conditioning hose, the sensing device configured to sense a connecting property.

5. The apparatus of claim 1, wherein the thermal latch further comprises an engagement feature, wherein the engagement feature is configured for manual engagement of the thermal latch.

6. The apparatus of claim 1, wherein the thermal latch comprises an electronic latch.

7. The apparatus of claim 1, wherein the thermal conditioning hose further comprises a communication pin, the communication pin configured to receive the coupling command from the electric aircraft.

8. The apparatus of claim 1, wherein the thermal latch further comprises an uncoupling sensor, the uncoupling sensor configured to uncouple the thermal conditioning hose from the electric aircraft upon the occurrence of an uncoupling event.

9. The apparatus of claim 1, further comprising a charging connector, the charging connector configured to charge the electric aircraft.

10. A method of locking a thermal conditioning hose to an electric aircraft comprising an on-board computing device, the method comprising:
   receiving a thermal conditioning hose comprising:
      a cable separate from a charging connecter for the electric aircraft;
      a thermal medium flow path configured to contain a flow of a thermal medium;
      a thermal medium return path, the thermal medium return path configured to contain a flow of the thermal medium from the electric aircraft; and
      a mating component, wherein the mating component is configured to make a connection with an electric aircraft port;
   connecting the thermal conditioning hose to the electric aircraft; and
   coupling, using a thermal latch, the thermal conditioning hose to the electric aircraft, wherein the thermal latch comprises a controller communicatively connected to the on-board computing device of the electric aircraft, wherein the controller is configured to:
receive a coupling command from the on-board computing device; and
control the coupling of the thermal latch to the electric aircraft based on the coupling command.

11. The method of claim 10, wherein the flow of the thermal medium is configured to flow into the electric aircraft and cool at least one aircraft component.

12. The method of claim 10, wherein the thermal conditioning hose comprises a communication pin, the communication pin configured to receive a signal from a remote device.

13. The method of claim 10, wherein the controller is communicatively connected to a sensing device of the thermal conditioning hose, the sensing device configured to sense a connecting property.

14. The method of claim 10, wherein coupling using the thermal latch comprises interacting within an engagement feature on the thermal latch, wherein the engagement feature is configured for manual engagement of the thermal latch.

15. The method of claim 1, wherein coupling using the thermal latch comprises coupling using an electronic latch.

16. The method of claim 10, wherein the thermal conditioning hose further comprises a communication pin, the communication pin configured to receive the coupling commands from the electric aircraft.

17. The method of claim 10, wherein the thermal latch further comprises an uncoupling sensor, the uncoupling sensor configured to uncouple the thermal conditioning hose from the electric aircraft upon the occurrence of an uncoupling event.

18. The method of claim 10, further comprising charging, using a charging connector, the charging connector configured to charge the electric aircraft.

* * * * *

UNITED STATES PATENT AND TRADEMARK OFFICE
CERTIFICATE OF CORRECTION

PATENT NO. : 11,973,288 B1
APPLICATION NO. : 18/121814
DATED : April 30, 2024
INVENTOR(S) : John Charles Palombini et al.

Page 1 of 2

It is certified that error appears in the above-identified patent and that said Letters Patent is hereby corrected as shown below:

In the Specification

Column 14, Line 47 reads: "...filed on Mar. 15, 2023 and entitled "A SYSTEM FOR ..."" but it should read: "... filed on Mar. 15, 2023 and entitled "SYSTEM FOR...""

Column 14, Line 53 reads: "...14, 2023 and entitled "AN APPARATUS AND A..."" but it should read: "14, 2023 and entitled APPARATUS AND A...""

Column 16, Line 29 reads: "...Application No. 27/405,840, filed on Aug. 28, 2022, and..." but it should read: "...Application No. 17/405,840, filed on Aug. 18, 2021."

Column 16, Line 32 reads: "...-sional Application No. 27/407,358, filed on Aug. 20, 2022,..." but it should read: "...-sional Application No. 17/407,358, filed on Aug. 20, 2021."

Column 38, Line 52 reads: "...U.S. patent application Ser. Nos. 16/948,157 and 16/048,140..." but it should read: "...U.S. patent application Ser. Nos. 16/948,157 and 16/948,140..."

Column 51, Line 6 reads: "...limitation a plurality of inputs x; that may receive numerical..." but it should read: "...limitation a plurality of $X_i$ that may receive numerical..."

Column 51, Line 14 reads: "...then be input into a function p, which may generate one or..." but it should read: "...then be input into a function $\varphi$, which may generate one or..."

Column 51, Line 15 reads: "...more outputs y. Weight w, applied to an input x; may..." but it should read: "...more outputs y. Weight $W_i$ applied to an input $X_i$ may..."

Column 51, Line 27 reads: "...semantic units according to weight w, that are derived using..." but it should read: "...semantic units according to weight $W_i$ that are derived using..."

Signed and Sealed this
Eighteenth Day of June, 2024

Katherine Kelly Vidal
*Director of the United States Patent and Trademark Office*

In the Claims

Column 82, Line 3, Claim 15 reads: "The method of claim 1 whereupon coupling using the..." but it should read: "The method of claim 11 whereupon coupling using the..."